(12) United States Patent
Chen et al.

(10) Patent No.: US 8,842,690 B2
(45) Date of Patent: Sep. 23, 2014

(54) SYSTEM, METHOD, AND MEDIA FOR NETWORK TRAFFIC MEASUREMENT ON HIGH-SPEED ROUTERS

(75) Inventors: Shigang Chen, Gainesville, FL (US); Jih-Kwon Peir, Gainesville, FL (US); Myungkeun Yoon, Seoul (KR); Tao Li, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 456 days.

(21) Appl. No.: 13/147,534

(22) PCT Filed: Apr. 2, 2010

(86) PCT No.: PCT/US2010/029772
§ 371 (c)(1),
(2), (4) Date: Aug. 2, 2011

(87) PCT Pub. No.: WO2010/115096
PCT Pub. Date: Oct. 7, 2010

(65) Prior Publication Data
US 2011/0289295 A1   Nov. 24, 2011

Related U.S. Application Data

(60) Provisional application No. 61/166,100, filed on Apr. 2, 2009.

(51) Int. Cl.
*H04N 1/21* (2006.01)
*H04L 12/26* (2006.01)
*H04L 12/879* (2013.01)
*H04L 12/24* (2006.01)

(52) U.S. Cl.
CPC ............. *H04L 43/022* (2013.01); *H04L 49/901* (2013.01); *H04L 41/142* (2013.01); *H04L 43/026* (2013.01)
USPC ....................................... 370/429

(58) Field of Classification Search
CPC .................................................... H04L 49/901
See application file for complete search history.

(56) References Cited

U.S. PATENT DOCUMENTS

2002/0103631 A1   8/2002   Feldmann et al.
2003/0200315 A1 *  10/2003   Goldenberg et al. ......... 709/225
(Continued)

OTHER PUBLICATIONS

Venkataraman, S., et al., "New Streaming Algorithms for Fast Detection of Superspreaders," Proceedings of NDSS '05, Feb. 2005.
(Continued)

*Primary Examiner* — Jay P Patel
(74) *Attorney, Agent, or Firm* — Saliwanchik, Lloyd & Eisenschenk

(57) ABSTRACT

A data structure is provided for storing network contact information based on an array of physical memory locations. Virtual vectors are constructed for each source, wherein each element in each virtual vector is assigned to a corresponding physical memory location within the array. The physical memory locations are shared between the virtual vectors uniformly at random so that the noise introduced by sharing can be predicted and removed. A method for storing network contact information is also provided in which a hash function is performed using the address of a source host to find a virtual vector for holding information about the source host. A second hash function is performed using the address of a destination host to find a virtual memory location, within the virtual vector, for holding information about the destination host. Finally, information is stored at a physical memory location assigned to the virtual memory location. Estimation range enhancement is further provided by performing multiple estimations with different sampling probabilities and selecting a best estimation based on a maximum likelihood method.

22 Claims, 23 Drawing Sheets

(56) References Cited

U.S. PATENT DOCUMENTS

| | | |
|---|---|---|
| 2006/0274762 A1 | 12/2006 | Pong |
| 2007/0297501 A1* | 12/2007 | Hussain et al. ............... 375/240 |
| 2008/0040519 A1* | 2/2008 | Starr et al. ..................... 710/39 |
| 2010/0115233 A1* | 5/2010 | Brewer et al. ..................... 712/7 |

OTHER PUBLICATIONS

Zhao, Q., et al., "Detection of Super Sources and Destinations in High-Speed Networks: Algorithms, Analysis and Evaluation," IEEE Journal on Selected Areas in Communication, Oct. 2006, pp. 1840-1852, vol. 24, No. 10.

Yoon, M., et al., "Fit a Spread Estimator in Small Memory," 2009 Proceedings IEEE INFOCOM, Apr. 2009, pp. 504-512.

Yoon, M., et al., "Fit a Compact Spread Estimator in Small High-Speed Memory," IEEE/ACM Transactions on Networking, 2010, vol. 18, Issue 1.

* cited by examiner

SYSTEM, METHOD, AND MEDIA FOR NETWORK TRAFFIC MEASUREMENT ON HIGH-SPEED ROUTERS

CROSS-REFERENCE TO RELATED APPLICATIONS

This application is the U.S. national stage application of International Application Serial No. PCT/US10/29772, filed Apr. 2, 2010, which claims the benefit of U.S. Provisional Application Ser. No. 61/166,100, filed Apr. 2, 2009, which are hereby incorporated by reference in its-their entirety, including all figures, tables and drawings.

BACKGROUND OF THE INVENTION

As networks have gotten faster and network traffic has exploded, network traffic measurement has become increasingly important for allocating network resources and ensuring network security. At the same time, this increased throughput has made these types of measurements, which are preferably taken at the line speed of the network, more challenging. Today, extremely efficient algorithms and data structures are needed to effectively measure such traffic.

For the purposes of many network traffic measurement problems, a network contact can be defined as a source and destination pair, for which the source has sent a network message, for example a network packet, to the destination. The source and destination can each be identified by a network address, such as an Internet Protocol (IP) address, a port number, a MAC address, or other addressing scheme; other fields in a packet header; or any combination thereof.

Spread estimation is an exemplary network traffic measurement problem with many practical applications. Spread estimation can refer to the estimation of the number of distinct destinations to which a source has sent messages during a measurement period (called the spread of the source or "fan-out") or the estimation of the number of distinct sources which have sent messages to a particular destination during a measurement period (called the spread of the destination or "fan-in"). Intrusion detection systems typically use fan-out to detect port scans, in which an external host attempts to establish too many connections to different internal hosts or different ports of the same host. Fan-out can also be used to predict the infection rate of a worm by estimating the spread of each of the infected hosts. Fan-in can be used to detect distributed denial of service attacks when too many hosts send traffic to a receiver, i.e., the spread of a destination is abnormally high. A large server farm may use fan-in to estimate the spread of each server (as a destination) in order to assess how popular the server's content is, which provides a guidance for resource allocation. An institutional gateway may use fan-in to monitor outbound traffic and determine the spread of each external web server that has been accessed recently. This information can also be used as an indication of the server's popularity, which helps the local proxy to determine the cache priority of the web content.

A spread estimator may be a software, hardware, or firmware module on a network router (or firewall) that inspects network messages as they arrive and estimates the spread of each source or destination. A spread estimator typically implements two functions. The first function is to store contact information extracted from arriving messages or packets. The second function is to estimate the spread of each source based on the collected information. In addition to estimation of a source's spread, the role of source and destination may be exchanged to use the same spread estimator to measure the spread of a given destination.

A major technical challenge for spread estimation and other network traffic measurement problems is how to fit the spread estimator or other measurement module in a small high-speed memory. Today's core routers forward most network packets on a fast forwarding path between network interfaces that bypasses the CPU and main memory. To keep up with the line speed, it is desirable to operate the measurement module in fast but expensive, size-limited memory, such as SRAM. Because many other essential routing, security, and performance functions may also run from such memory, it is expected that the amount of high-speed memory allocated for each measurement module will be small. Moreover, depending on the application, the measurement period can be quite long, which requires the module to store an enormous amount of contacts or other information. For example, to measure the popularity of web servers, the measurement period is likely to be hours or even days. Hence, each measurement module's data structure is designed to be as compact as possible.

Returning to the example of spread estimation, consider the following scenario. Collected from the main gateway router at the University of Florida on a day in 2005, an Internet traffic trace produced around 10 million distinct contacts from 3.5 million distinct external sources. Assuming a network router can only allocate 1 MB of high-speed memory for a spread estimator, based on this scenario, an average of only 2.3 bits can be allocated for tracking the contacts from each distinct source over a day long measurement period. Today's traffic likely far exceeds these figures, and therefore would require an even more compact storage solution.

Existing estimators can be classified into several categories based on how they store contact information: 1) storing per-flow information, such as Snort and FlowScan, 2) storing per-source information, such as Bitmap Algorithms and One-level/Two-level Algorithms and 3) mapping sources to the columns of a bit matrix, where each column stores contacts from all sources that are mapped to it, such as the online streaming module proposed by Zhao et al. in "Detection of Super Sources and Destinations in High-Speed Networks: Algorithms, Analysis and Evaluation," *IEEE JSAC*, vol. 24, no. 10, October 2006) (referred to hereinafter merely as "OSM"). In the above described scenario, the first two categories will fail because 2.3 bits are not enough to store the contacts of each of 3.5 million distinct sources. Indeed, Snort maintains a record for each active connection and a connection counter for each source IP. Thus, keeping the per-flow state tends to be too memory-intensive for a high-speed router, particularly when the fast memory allocated to the function of spread estimation is small. In addition, the One-Level/Two-Level Algorithms maintain two hash tables where one hash table stores all distinct contacts that occurred during the measurement period, including the source and destination addresses of each contact, and the other hash table stores the source addresses and a contact counter for each source address. As discussed below, OSM is also ineffective because mapping multiple sources to one column introduces significant, irremovable errors in spread estimation.

For the One-Level/Two-Level Algorithms, a probabilistic sampling technique is often used to reduce the number of contacts to be stored. In addition, instead of storing the actual source/destination addresses in each sampled contact, bitmaps may be used to save space. For this technique, each source is assigned a bitmap where a bit is set for each destination that the source contacts. The number of contacts stored in a bitmap can be estimated based on the number of bits set. An index structure is used to map a source to its bitmap. The index structure is typically a hash table where each entry stores a source address and a pointer to the corresponding bitmap. However, such a spread estimator cannot fit in a tight memory space where only a few bits are available for each source. If each bitmap is sufficiently long, the number of bitmaps will have to be reduced and there will not be enough bitmaps for all sources.

One solution to the problem of not having enough bitmaps for all sources is to share each bitmap among multiple sources. For example, a simple spread estimator may use a bit matrix whose columns are bitmaps. Sources are assigned to columns through a hash function. For each contact, the source address is used to locate the column and, through another hash function, the destination address is used to determine a bit in the column to be set. The number of contacts stored in a column can be estimated based on the number of bits set. However, the estimation is for contacts made by all sources that are assigned to the column, not for the contacts of a specific source under query.

The information stored for one source in a column is the noise for others that are assigned to the same column. This noise must be removed in order to estimate the spread correctly. To solve this problem, OSM assigns each source randomly to l (typically three) columns through l hash functions, and sets one bit in each column when storing a contact. A source will share each of its columns with a different set of other sources. Consequently the noise (i.e., the bits set by other sources) in each column will be different. Based on such difference, OSM removes the noise and estimates the spread of the source.

However, OSM also has problems. Not only does it increase the overhead by performing l+1 hash operations, making l memory accesses and using l bits for storing each contact, but the noise can be too much to be removed in a compact memory space where a significant fraction of all bits (e.g., above 50%) are set. The columns that high-spread sources are assigned to have mostly ones; they are called dense columns, which present a high level of noise for other sources. The columns that only low-spread sources are assigned to are likely to have mostly zeros; they are called sparse columns. In OSM, each high-spread source will create l dense columns. In a tight space, dense columns account for a significant fraction of all columns. The probability for a low-spread source to be assigned to/dense columns is not negligible. Since these dense columns have many bits set at common positions, the difference-based noise removal will not work well, and the spread estimation will be inaccurate. The experimental results discussed below confirm this analysis.

Also related is the detection of stealthy spreaders using online outdegree histograms as proposed by Gao et al. in "Detecting Stealthy Spreaders Using Online Outdegree Histograms," (*Proc. of IEEE International Workshop on Quality of Service* '07, pp. 145-153, June 2007). This solution detects the event of collaborative address scan by a large number of sources, each scanning at a low rate. It is able to estimate the number of participating sources and the average scanning rate, but it cannot perform the task of estimating the spread of each individual source in the arrival packets.

Existing estimators divide a memory space into bitmaps and then allocate the bitmaps to sources. If per-source bitmaps are used, and each bitmap has a sufficient number of bits, then the total memory requirement will be too large. On the other hand, if bitmaps are shared between sources, it is hard to remove the noise caused by sources that are assigned to the same bitmap.

Accordingly, there is a need for a data structure, method, and system for spread estimation that provides accurate estimates while using a very small memory space. Spread estimation is highlighted here as an illustrative example of a network traffic measurement problem that may be solved with embodiments of the subject invention. The subject invention can also be applied to obtain, store, and analyze other network traffic data.

BRIEF SUMMARY OF THE INVENTION

Embodiments of the subject invention pertain to systems, methods, and media for network traffic measurement. In one aspect of an embodiment of the invention, a data structure is provided for storing network contact information in a small memory space. The data structure is based on an array of physical memory locations. Virtual vectors are constructed from the array for each source, wherein each element in each virtual vector is assigned to a corresponding physical memory location within the array. The physical memory locations are shared between the virtual vectors uniformly at random so that the noise introduced by sharing can be predicted and removed.

In another aspect of an embodiment of the invention, a method for storing network contact information is provided. In accordance with the method, contact information is received from a network router including identifying information for a destination host and a source host that sent a network message to the destination host. A hash function is performed using the identifying information for the source host and the result is used to find a virtual vector assigned for holding information pertaining to that source host. A second hash function is performed using the identifying information for the destination host and the result is used to find a virtual memory location, within the virtual vector, assigned for holding information pertaining to that destination host. Finally, information is stored at a physical memory location assigned to the virtual memory location.

Particular embodiments of the subject invention pertain to improved methods for estimating spread on high-speed routers. According to an embodiment, a fixed-length array is used to store contact information as network packets stream through a router. Each source host (or destination host if fan-in is being measured) is assigned a virtual vector made up of physical memory locations randomly but uniformly selected throughout the array. Each element of the virtual vector is further indexed to a destination host being contacted by the source. Because the array has a finite length, collisions will occur where physical memory locations are shared by different source and destination hosts; however, because the sharing of physical memory locations is random and uniform throughout the array, the noise created by the shared memory in the entire array can be estimated. The noise created in the virtual vector is proportional to that of the entire array. Therefore, an accurate estimate of the spread of a particular host can be obtained by calculating and subtracting out the estimated noise from the host's virtual vector.

Further embodiments provide methods for increasing estimation range of the spread. In one embodiment, the estimation upper bound is increased by enlarging the virtual vector size. In another embodiment, a sampling module is adopted. In a preferred embodiment, multiple independent estimations using the subject virtual vectors are performed with different sampling probabilities, and the best of the estimations is selected based on a maximum likelihood method.

It should be noted that this Brief Summary is provided to generally introduce the reader to one or more select concepts described below in the Detailed Disclosure in a simplified form. This Summary is not intended to identify key and/or required features of the claimed subject matter. The invention is defined by the claims below.

for CSE and OSM, together with the numerically-calculated standard deviation for CSE based on (26) and (24).

Figure 10A:
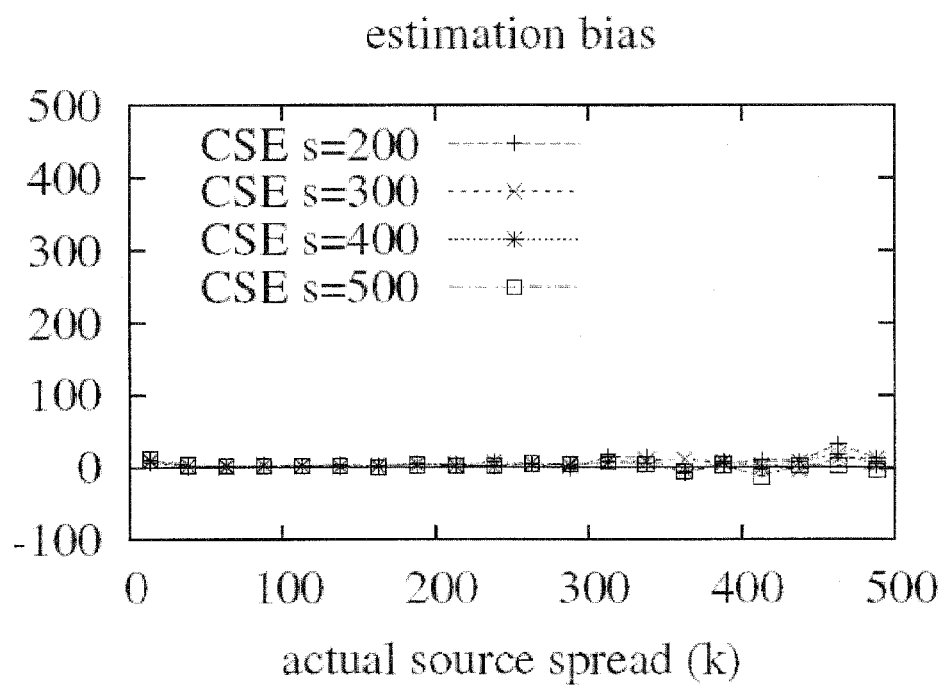
Figure 10B:
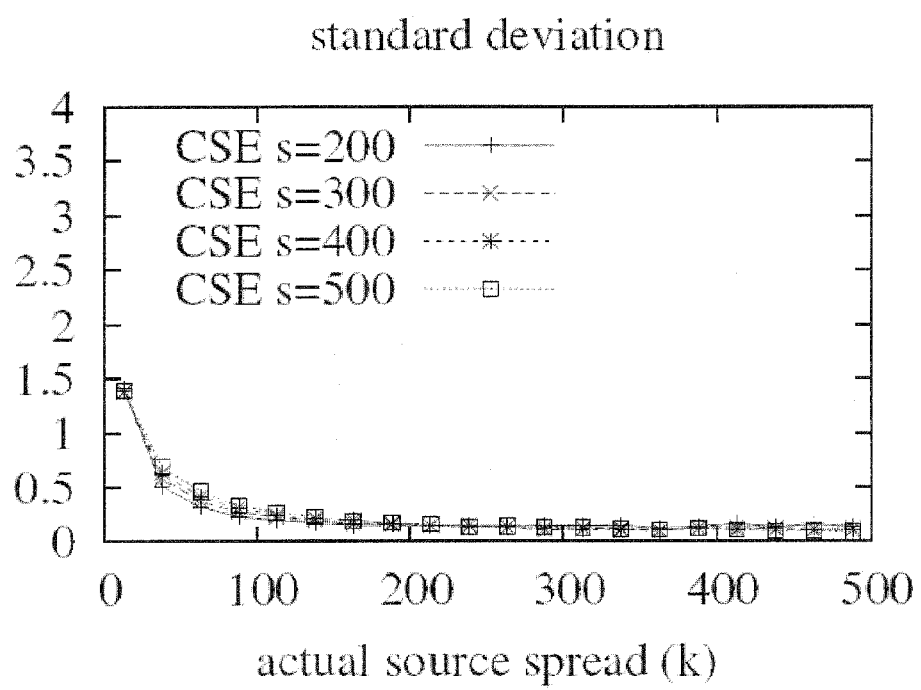

FIGS. 10A and 10B show plots of experimental data showing the bias and standard deviation of particular embodiments of CSE. FIG. 10A shows the bias of CSE, which is the measured $E(\hat{k}-k)$ with respect to k. FIG. 10B shows the standard deviation of CSE, which is the measured $$\frac{\sqrt{Var(\hat{k})}}{k}.$$

Figure 11A:
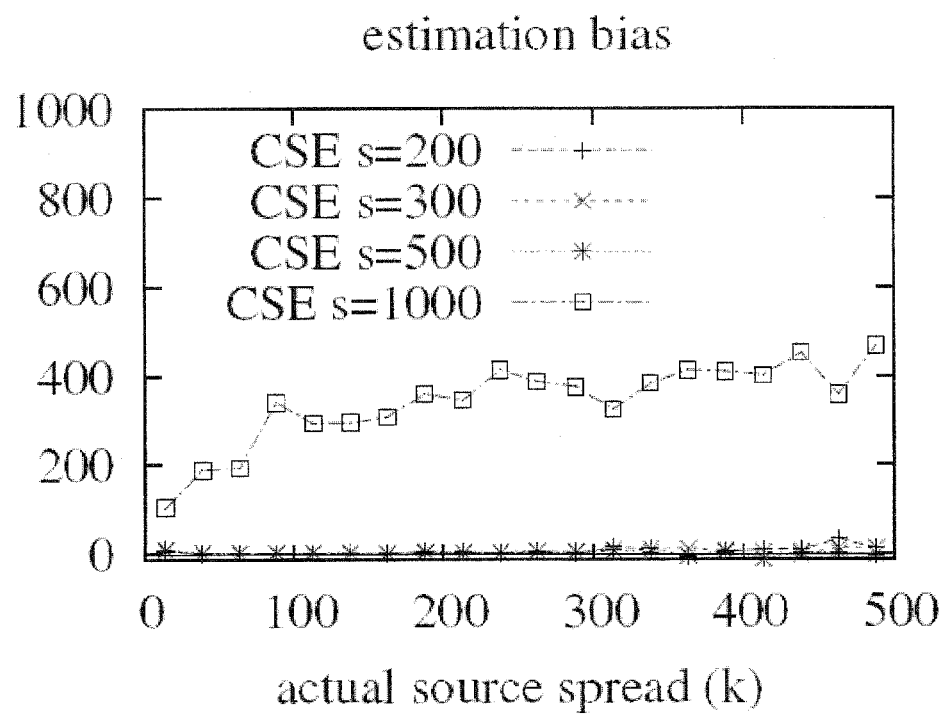
Figure 11B:
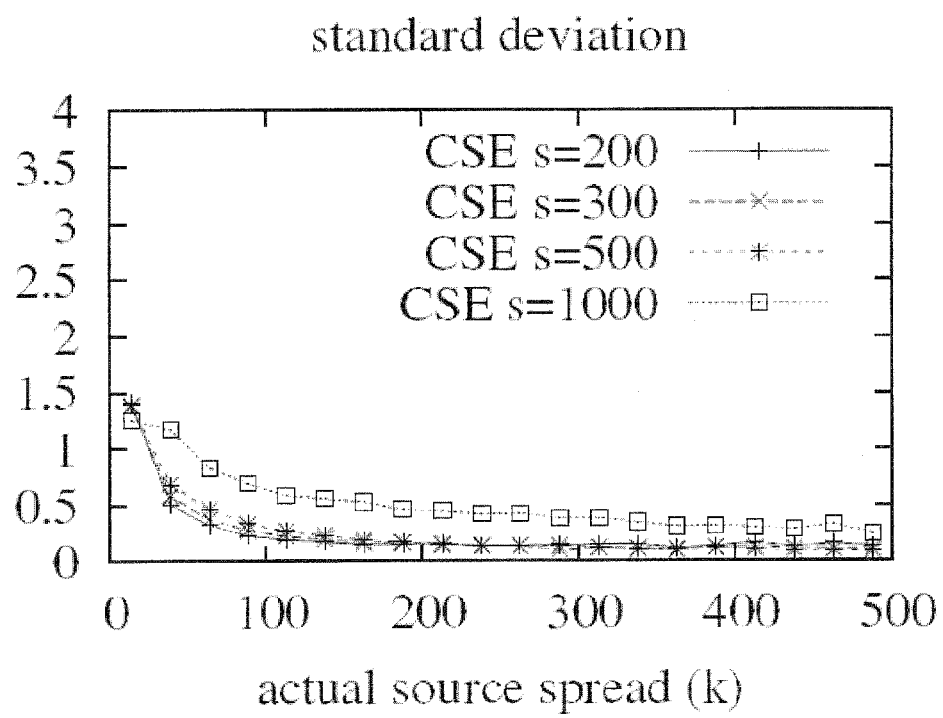

FIGS. 11A and 11B show plots of experimental data showing the bias and standard deviation of particular embodiments of CSE. FIG. 11A shows the bias of CSE, which is the measured $E(\hat{k}-k)$ with respect to k. FIG. 11B shows the standard deviation of CSE, which is the measured $$\frac{\sqrt{Var(\hat{k})}}{k}.$$

Figure 12A:
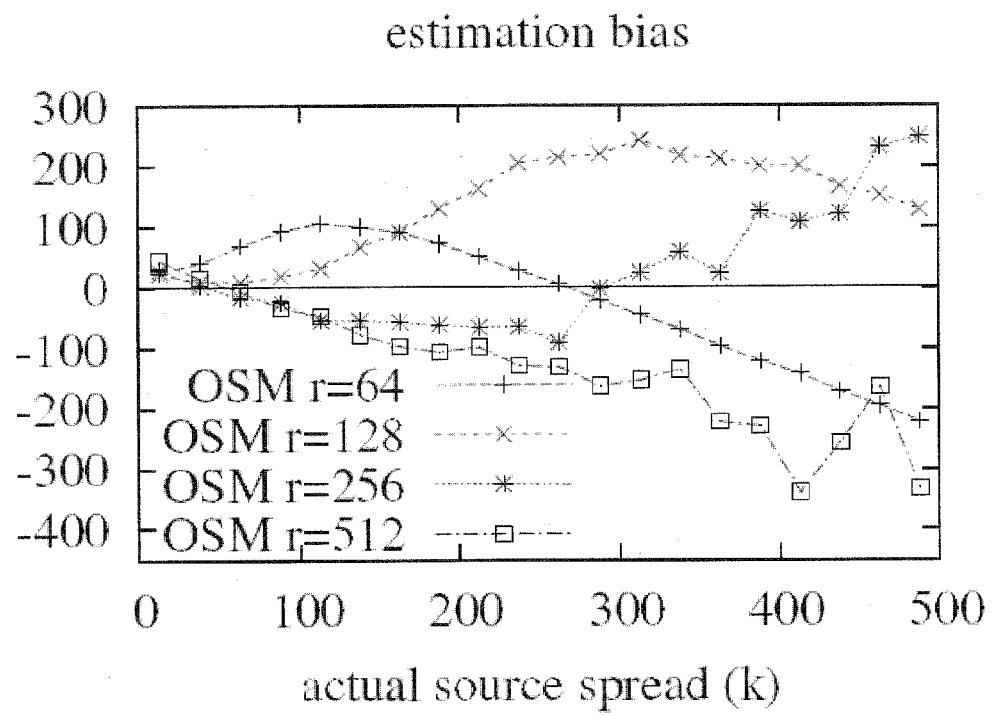
Figure 12B:
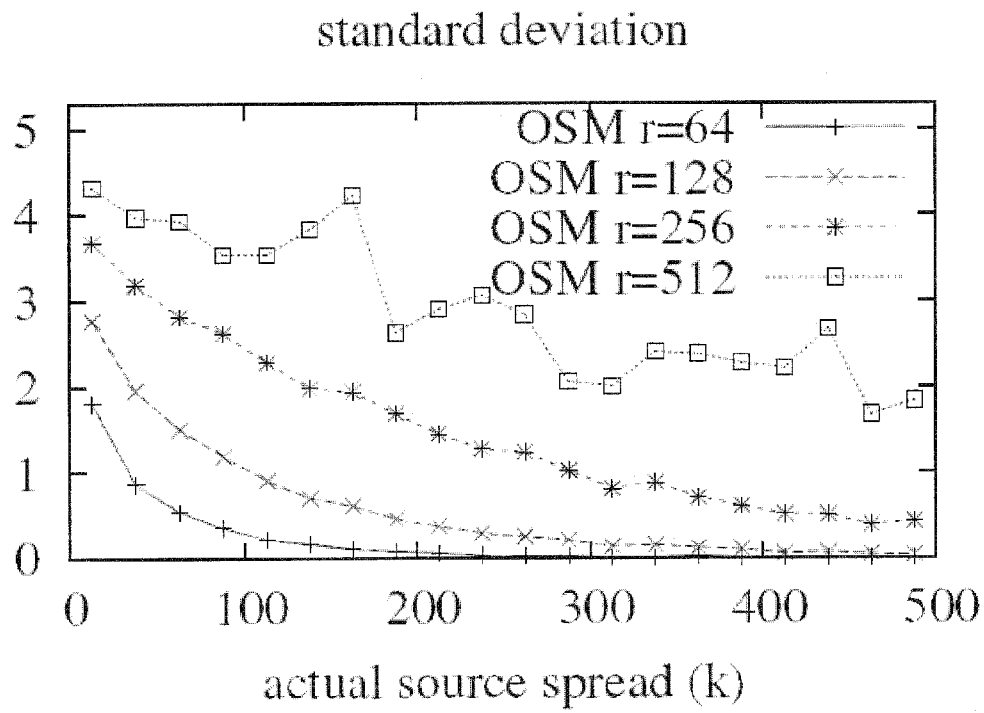

FIGS. 12A and 12B show plots of experimental data showing the bias and standard deviation of particular implementations of OSM. FIG. 12A shows the bias of OSM, which is the measured $E(\hat{k}-k)$ with respect to k. FIG. 12B shows the standard deviation of OSM, which is the measured $$\sqrt{\frac{Var(\hat{k})}{k}}.$$

Figure 13A:
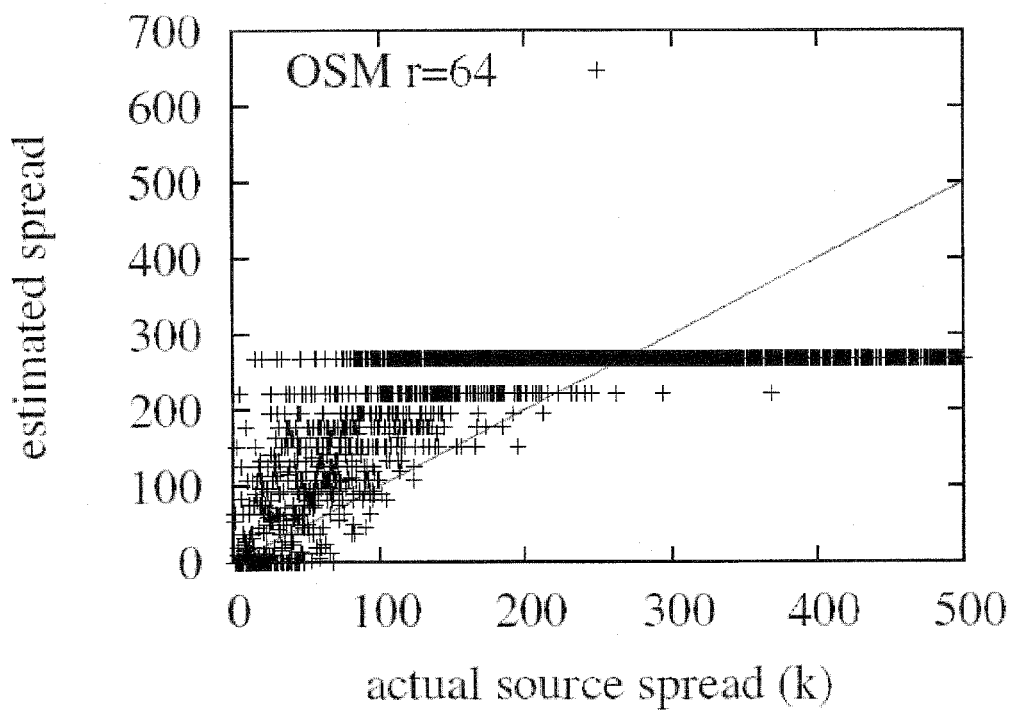
Figure 13B:
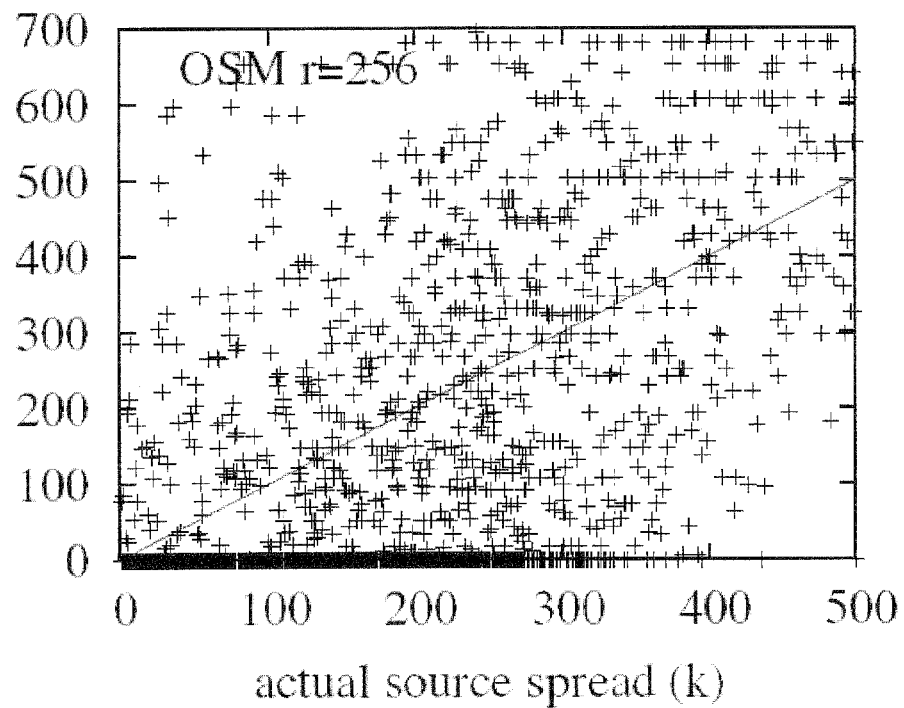

FIGS. 13A and 13B show plots of experimental data showing the accuracy of particular implementations of OSM. FIG. 13A shows the distribution of (k, $\hat{k}$) for all sources under OSM when r=64, where k and $\hat{k}$ are the true spread and the estimated spread, respectively. FIG. 13B shows the distribution of (k, $\hat{k}$) OSM when r=256.

Figure 14A:
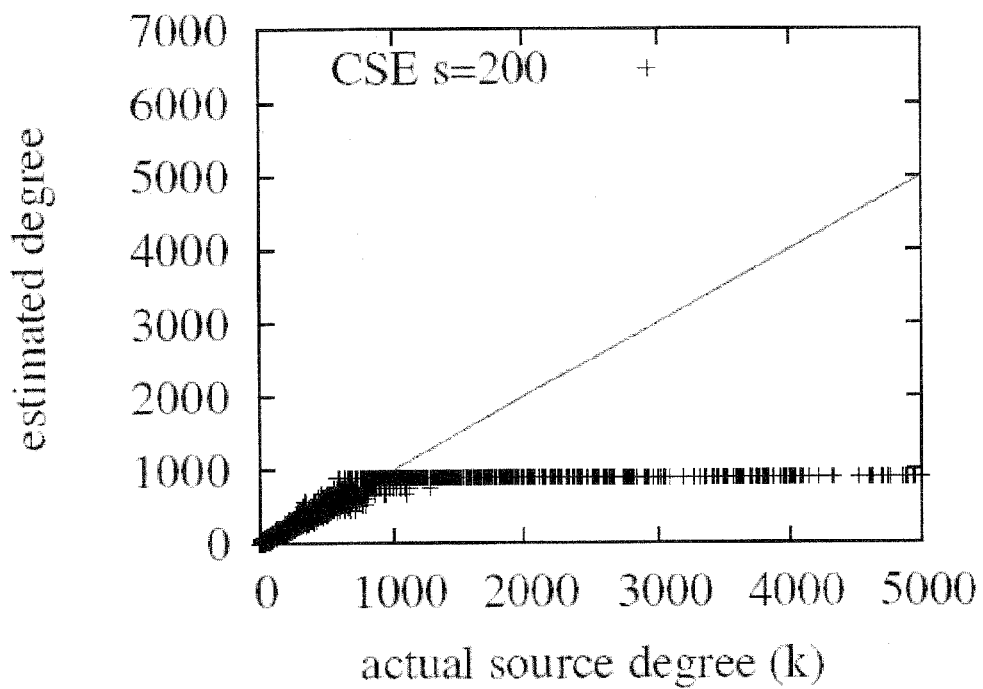
Figure 14B:
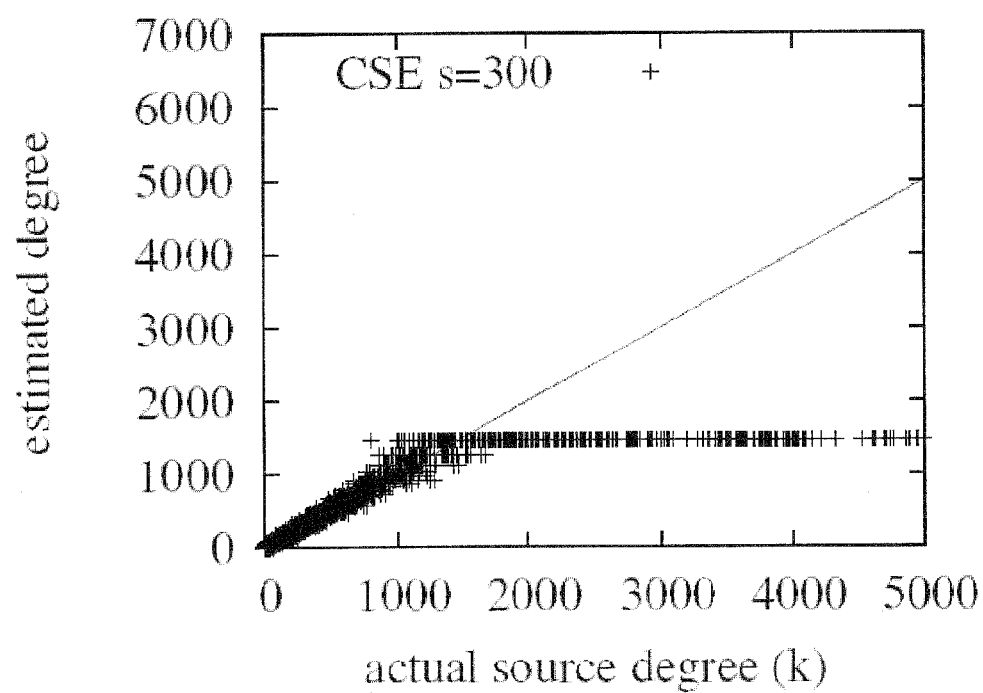
Figure 14C:
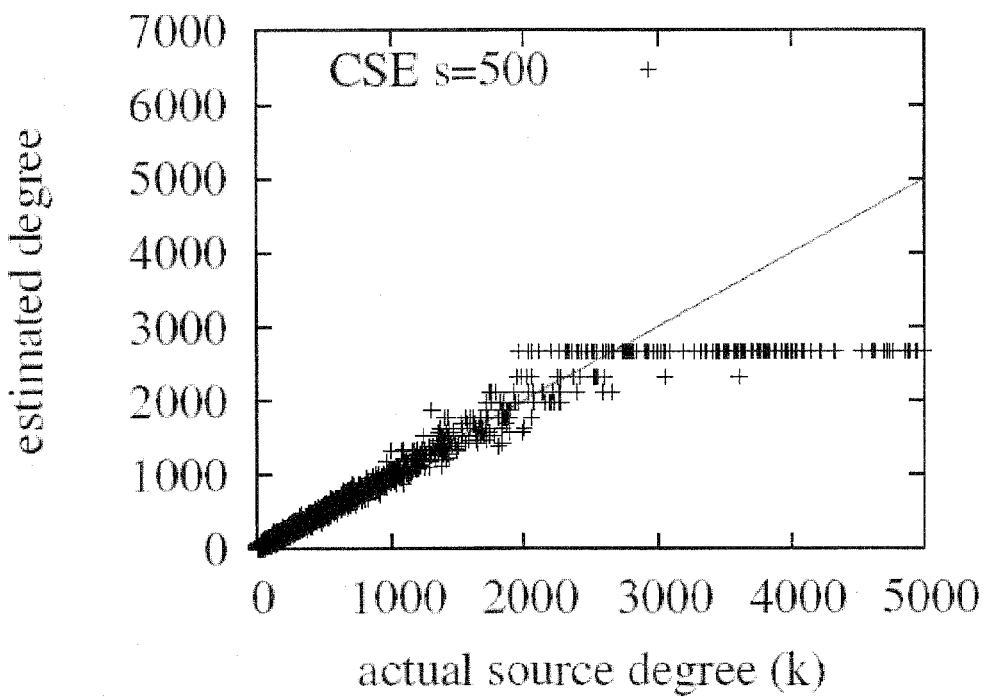
Figure 14D:
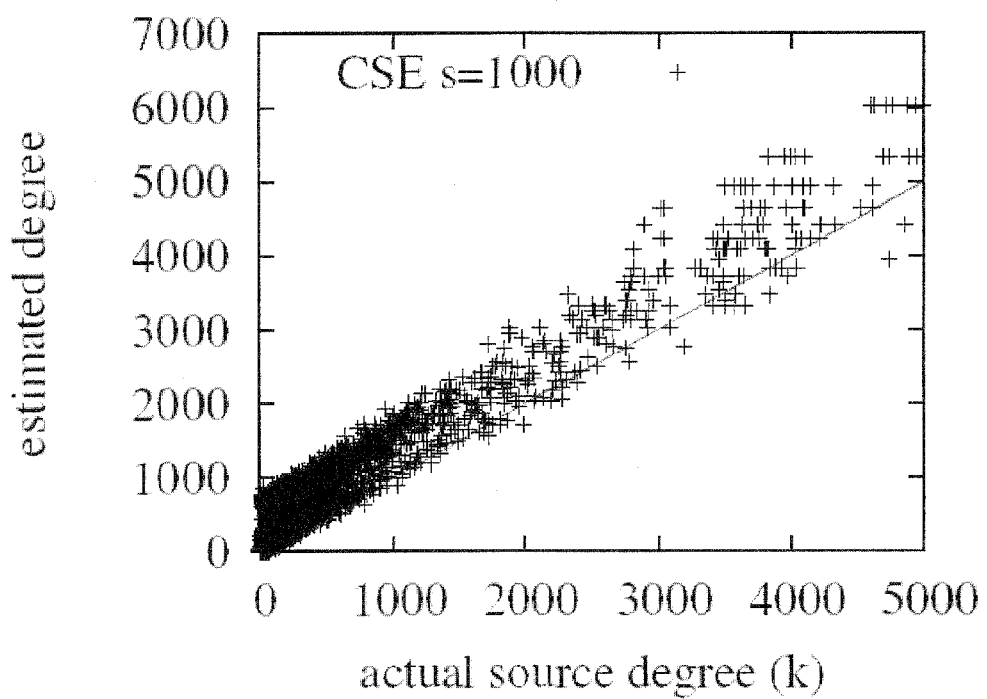

FIGS. 14A-14D are plots of experimental data showing the accuracy of particular embodiments of the subject invention (CSE) when the memory allocated is 1 MB and the spread s=200 (FIG. 14A), s=300 (FIG. 14B), s=500 (FIG. 14C), and s=1,000 (FIG. 14D). Each point in the plots represents a source, whose x coordinate is the true spread k and y coordinate is the estimated spread $\hat{k}$.

Figure 15A:
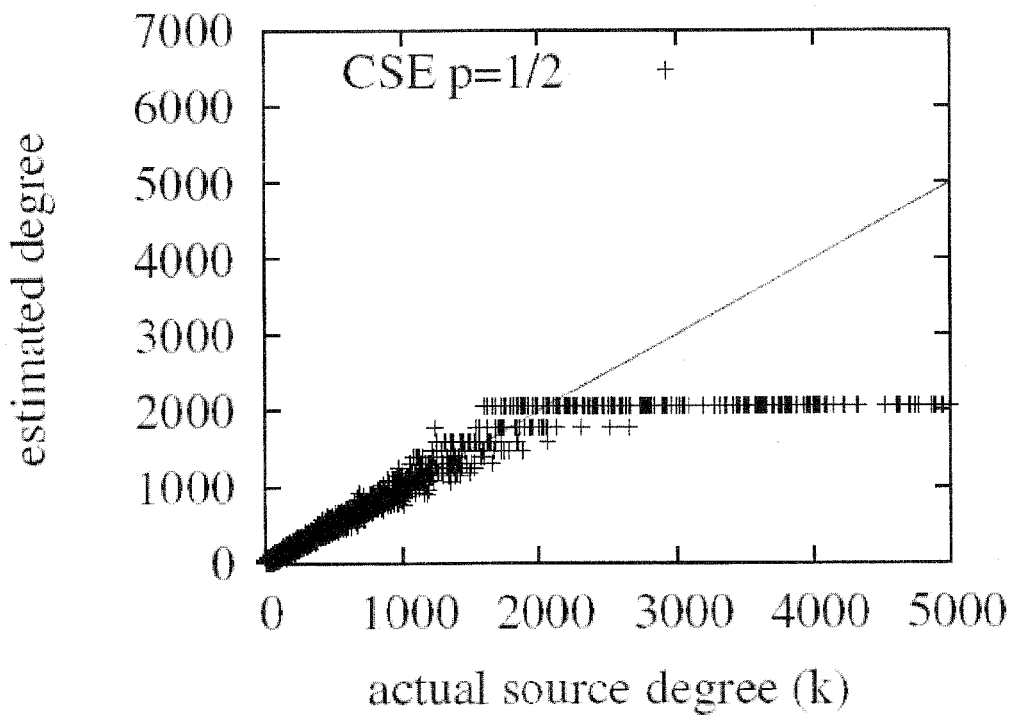
Figure 15B:
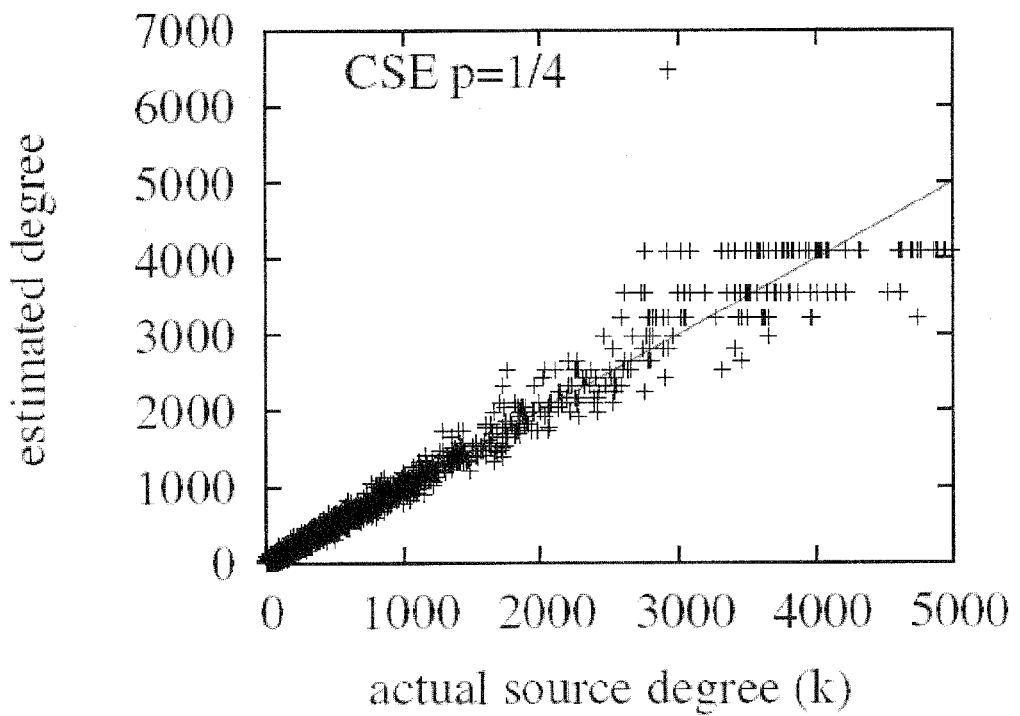
Figure 15C:
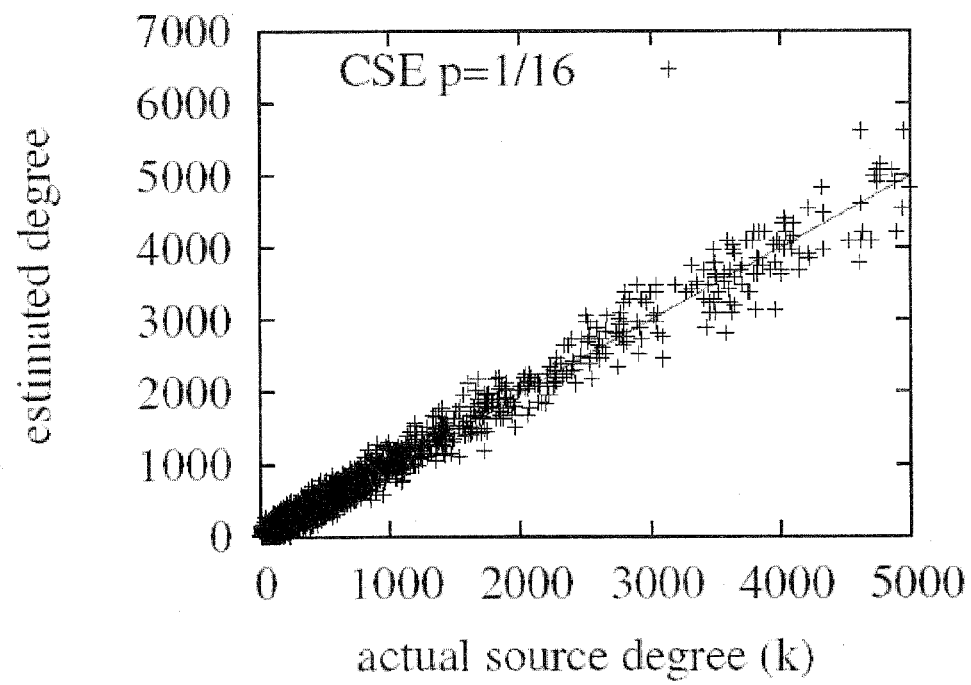

FIGS. 15A-15C are plots of experimental data showing the accuracy of particular embodiments of the subject invention (CSE) incorporating a sampling module when the memory allocated is 1 MB and the probability $$p = \frac{1}{2}, \quad \text{(FIG. 15A)}$$

$$p = \frac{1}{4}, \text{ and} \quad \text{(FIG. 15B)}$$

$$p = \frac{1}{16}, \quad \text{(FIG. 15C)}$$

Figure 16A:
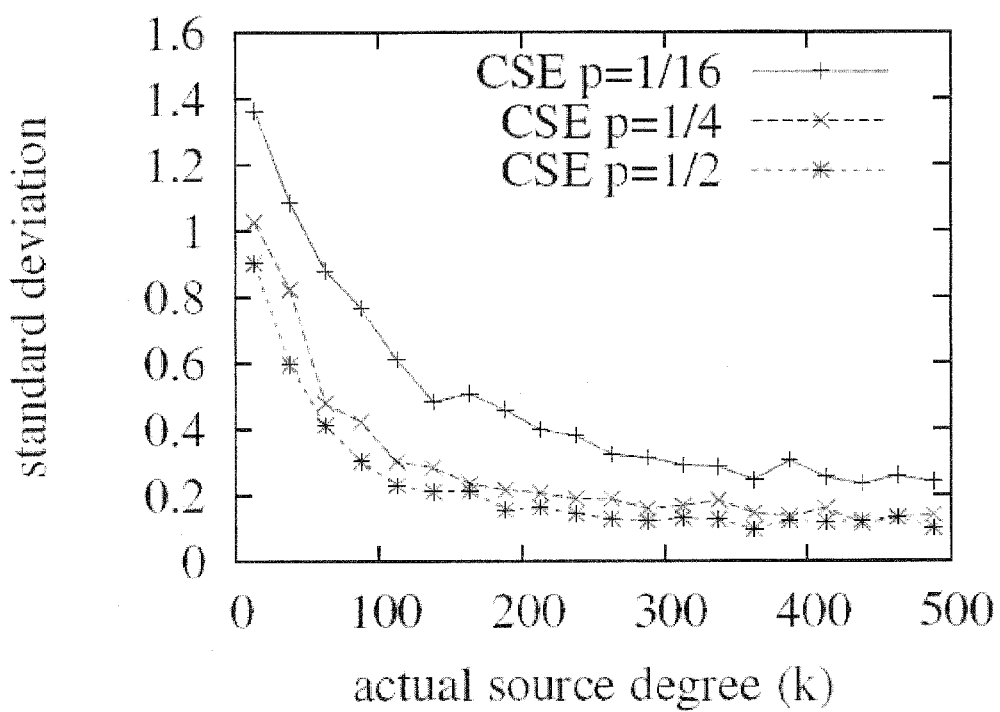
Figure 16B:
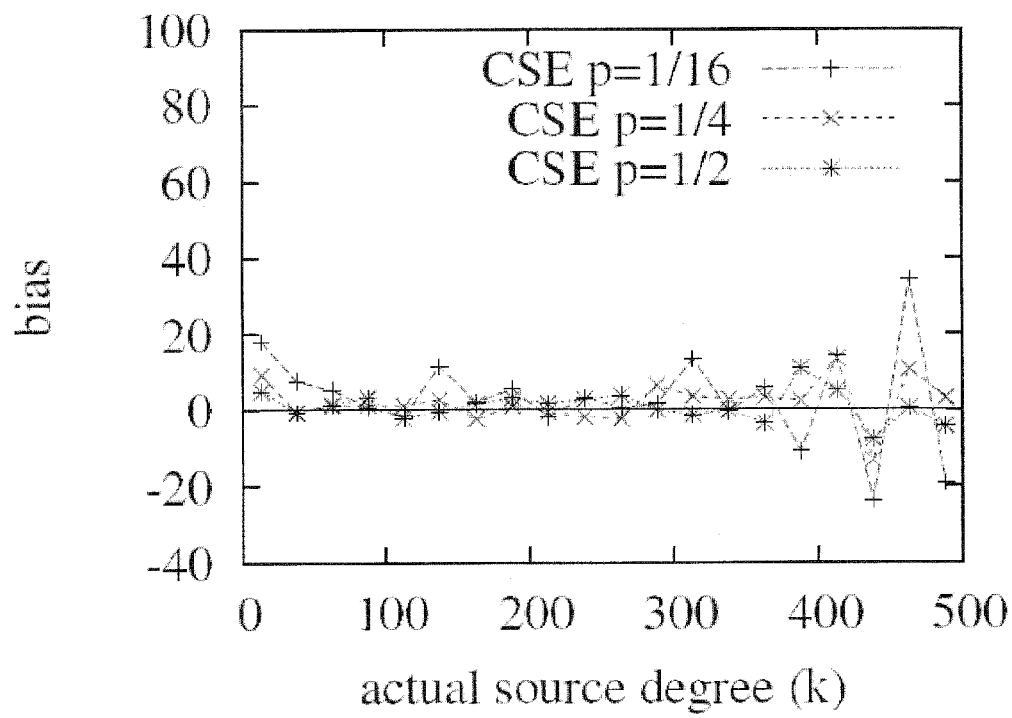

FIGS. 16A and 16B are plots of experimental data showing the standard deviation and bias of particular embodiments of the subject invention (CSE). FIG. 16A shows the standard deviation of the spread values estimated by CSE with sampling probability p. It is the value of $$\sqrt{\frac{Var(\hat{k})}{k}}$$

measured from the experiments. FIG. 16B shows the bias of the estimated spreads. It is the average difference between the estimated spread and the actual spread, i.e., the measured $E(\hat{k}-k)$ value.

Figure 17A:
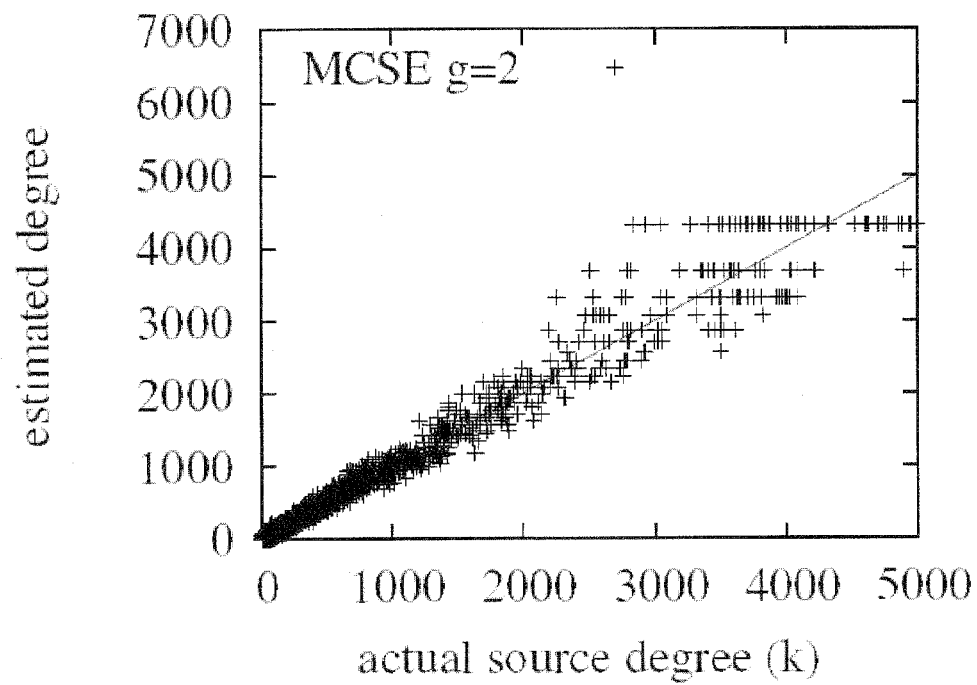
Figure 17B:
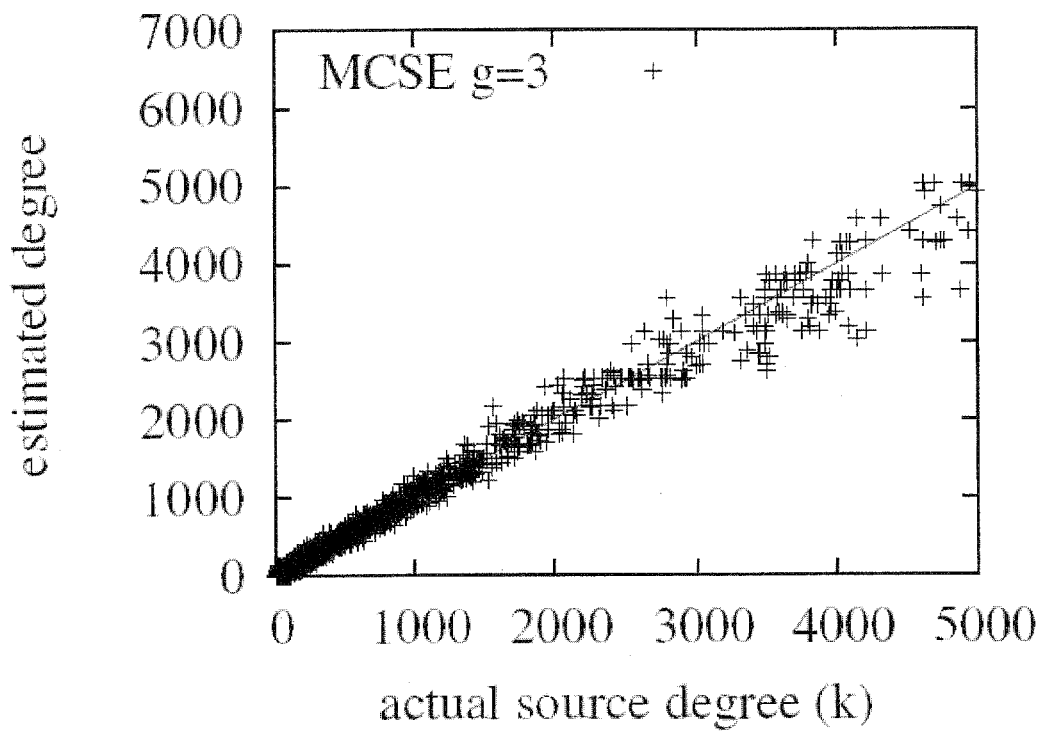
Figure 17C:
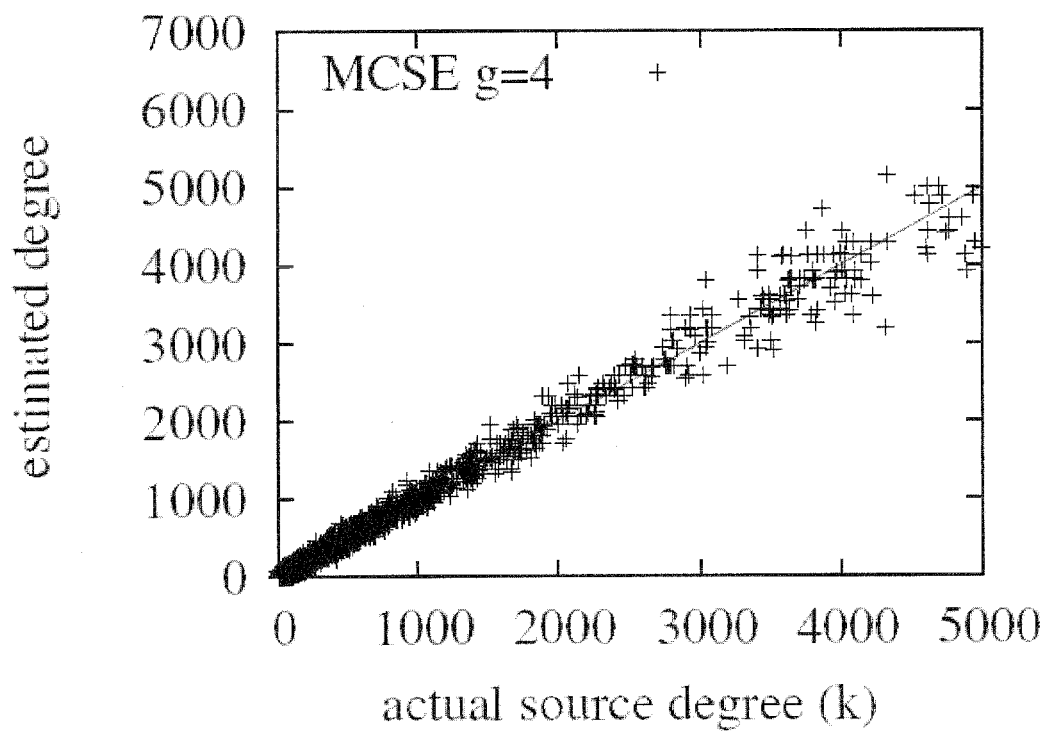

FIGS. 17A-17C are plots of experimental data showing the accuracy of particular embodiments of the subject invention (MCSE) when the memory allocated is 1 MB and the number of segments g=2 (FIG. 17A), g=3 (FIG. 17B), and g=4 (FIG. 17C).

Figure 18A:
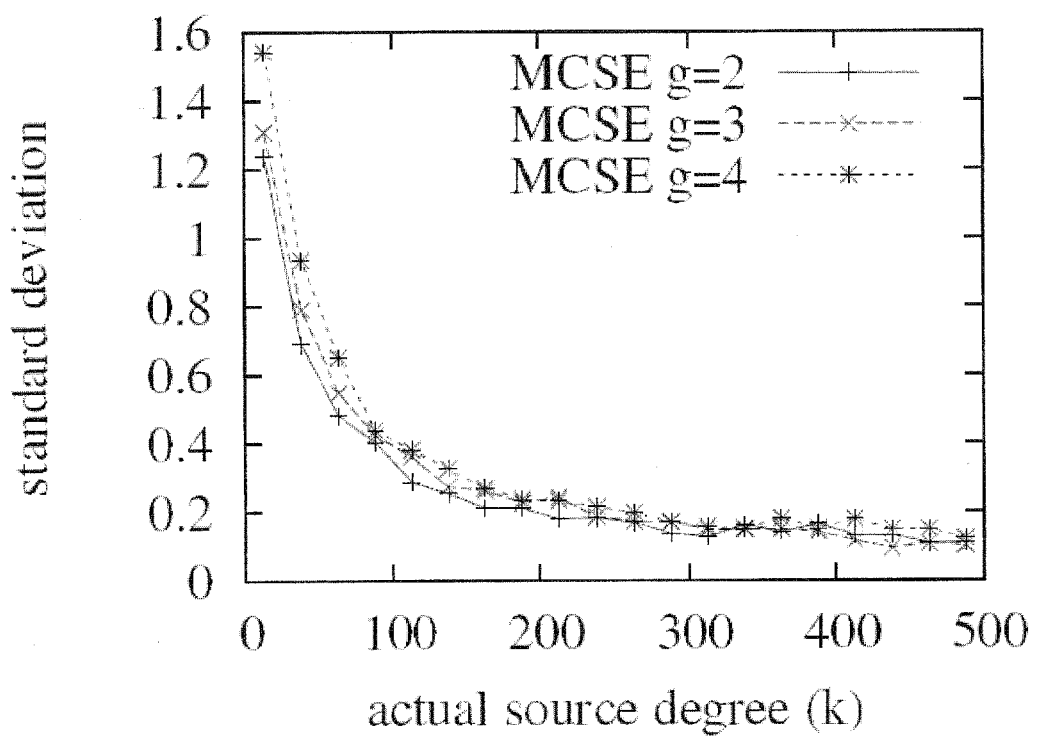
Figure 18B:
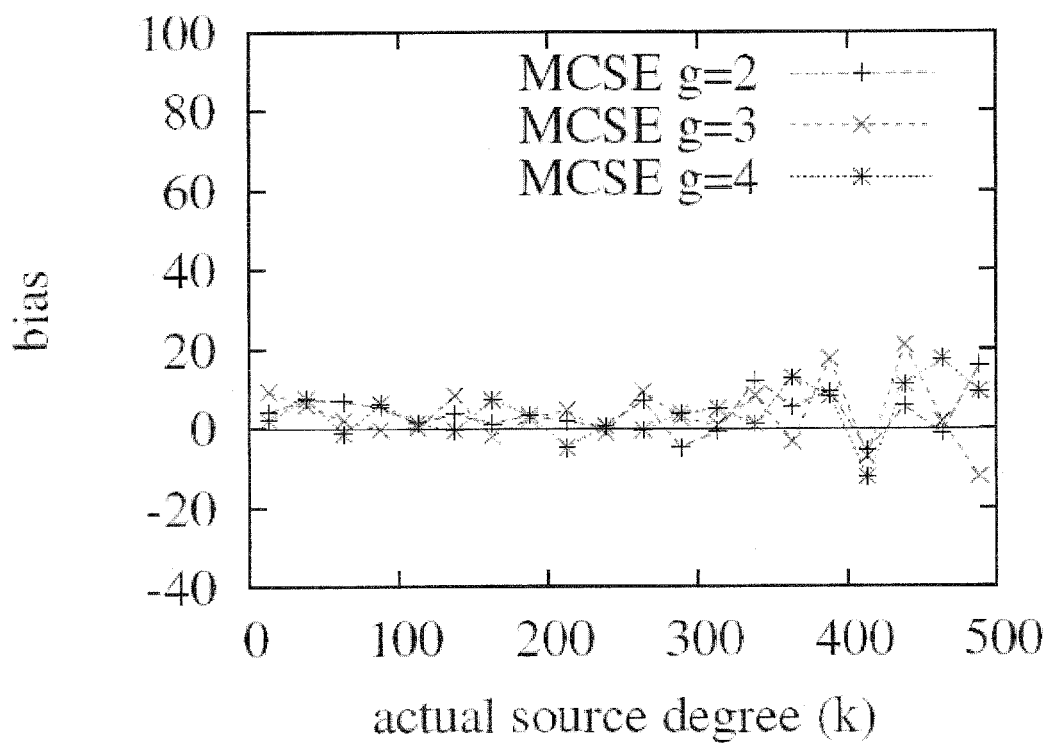

FIGS. 18A and 18B are plots of experimental data showing the standard deviation and bias of particular embodiments of the subject invention (MCSE). FIG. 18A shows the standard deviation of the spread values estimated by MCSE whose number of bit segments varies from 2 to 4. The standard deviation is the value of measured $$\sqrt{\frac{\mathrm{Var}(\hat{k})}{k}}$$

from the experiments. FIG. 18B shows the bias of the estimated spreads. It is the average difference between the estimated spread and the actual spread, i.e., the measured $E(\hat{k}-k)$ value.

DETAILED DISCLOSURE OF THE INVENTION

Embodiments of the subject invention pertain to systems, methods, and media for network traffic measurement. In one aspect of an embodiment of the invention, a data structure is provided for storing network contact information in a small memory space. The data structure is based on an array of physical memory locations. Virtual vectors are constructed from the array for each source, wherein each element in each virtual vector is assigned to a corresponding physical memory location within the array. The physical memory locations are shared between the virtual vectors uniformly at random so that the noise introduced by sharing can be predicted and removed. The physical memory locations can comprise any number of data elements. In a particular embodiment of the invention, the physical memory locations are single bits and the array is a one-dimensional bit array. In other embodiments, the data structure for the physical memory locations is based on a two-dimensional array, a hash table, a tree, or other data structure known in the art.

In another aspect of an embodiment of the invention, a method for storing network contact information is provided. In accordance with the method, contact information is received from a network router including identifying information for a destination host and a source host that sent a network message to the destination host. A hash function is performed using the identifying information for the source host and the result is used to find a virtual vector assigned for holding information pertaining to that source host. A second hash function is performed using the identifying information for the destination host and the result is used to find a virtual memory location, within the virtual vector, assigned for holding information pertaining to that destination host. Finally, information is stored at a physical memory location assigned to the virtual memory location. In a further embodiment, more than one virtual memory location is assigned to the physical memory location.

Particular embodiments of the subject invention pertain to improved methods for estimating spread on high-speed routers. According to an embodiment, a fixed-length array is used to store contact information as network packets stream through a router. Each source host (or destination host if fan-in is being measured) is assigned a virtual vector made up of physical memory locations randomly but uniformly selected throughout the array. Each element of the virtual vector is further indexed to a destination host being contacted by the source. Because the array has a finite length, collisions will occur where physical memory locations are shared by different source and destination hosts; however, because the sharing of physical memory locations is random and uniform throughout the array, the noise created by the shared memory in the entire array can be estimated. The noise created in the virtual vector is proportional to that of the entire array. Therefore, an accurate estimate of the spread of a particular host can be obtained by calculating and subtracting out the estimated noise from the host's virtual vector.

Further embodiments of the subject invention create a virtual bit vector for each source by taking bits uniformly at random from a common pool of available bits. In previous estimators, such as OSM, two bitmaps do not share any one bit. When sources share a common bitmap they share all bits in the bitmap. Therefore, sources either do not cause noise to each other, or they cause severe noise. Each source experiences a different level of noise that cannot be predicted. In an embodiment of the invention, two virtual vectors may share one or more common bits. Thus, while each source has its own virtual vector to store its contacts, noise still occurs through the common bits between two vectors. However, because the bits in virtual vectors are randomly selected, there is an equal probability for any two bits from different vectors to be the same physical bit. The probability for the contacts of one source to cause noise to any other source is the same. When there are a large number of sources, the noise that they cause to each other will be roughly uniform. Such uniform noise is measured and removed.

The subject matter of the present invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

Figure 1:
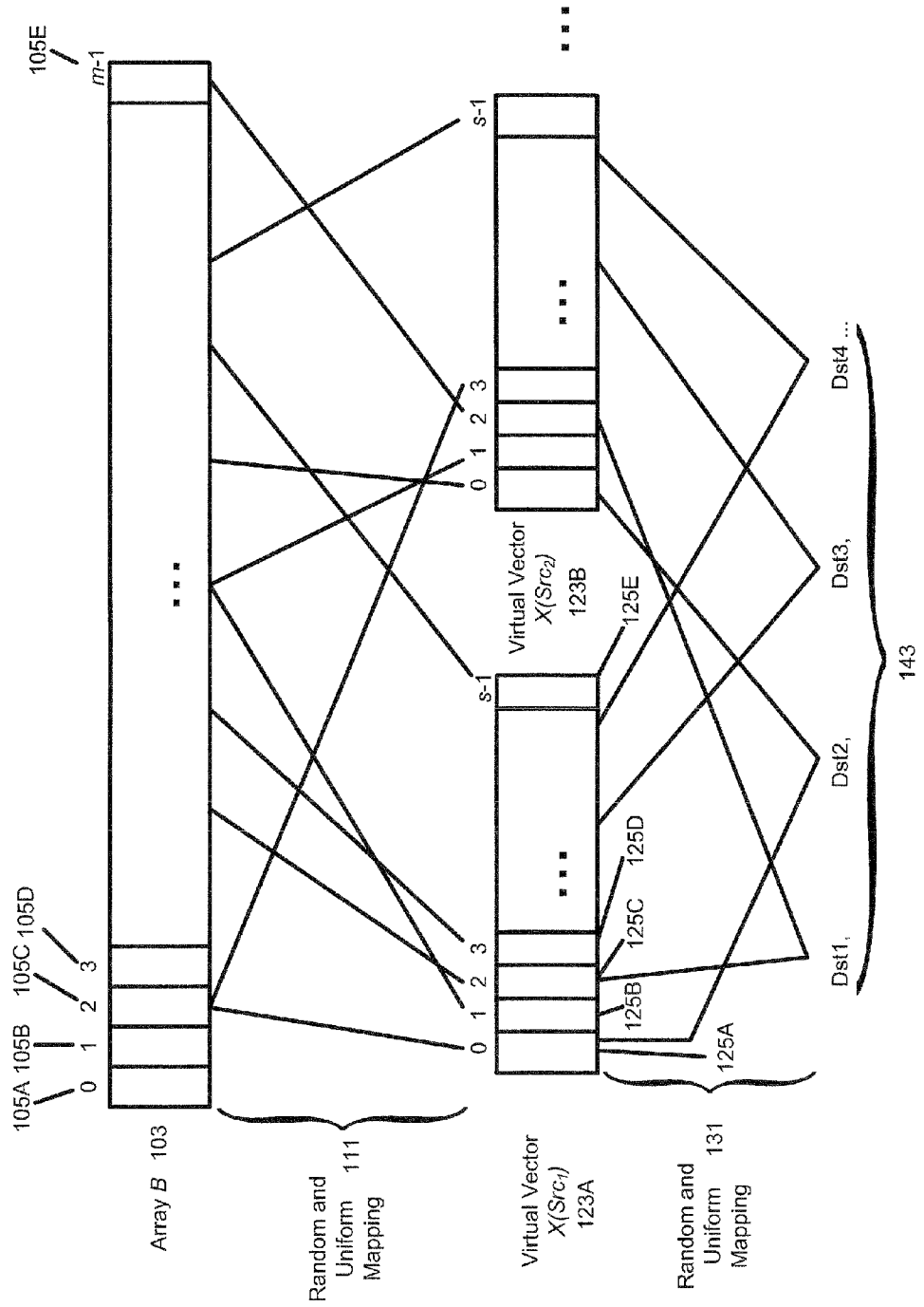
FIG. 1 shows a data structure in accordance with an embodiment of the subject invention.

FIG. 1 shows a data structure in accordance with an embodiment of the subject invention. As discussed above, the data structure may be distributed and may reside on one or more computer-readable media known in the art. In this embodiment the data structure is based on an Array B 103 of size m having physical memory locations 105A-E. In a preferred embodiment, the data structure can be a bit array. However, as discussed above, the physical memory locations may represent bits, bytes or chars, integers, doubles, or any other memory elements known in the art. The size of m may vary in different embodiments and may be quite large. The physical memory locations 105A-E depicted here are not exhaustive as indicated by the ellipse. Also shown are virtual vectors 123A-B of size s, each having virtual memory locations, for example virtual memory locations 125A-E. The virtual memory locations depicted here are not exhaustive as indicated by the ellipses. In addition, the virtual vectors can also have varying lengths (i.e., not all virtual vectors are of size s). Moreover, additional virtual vectors may be constructed in the same manner as virtual vectors 123A-B. In a particular embodiment of the invention, each virtual vector is assigned to store information related to a particular source host. Here, virtual vector 123A is assigned to $Src_1$ and virtual vector 123B is assigned to $Src_2$.

As shown by a mapping 111, the virtual memory locations in each virtual vector are randomly and uniformly assigned to the physical memory locations in the Array B 103. As shown, the physical memory locations may be shared by separate virtual memory locations. For example, virtual memory location 125A in virtual vector 123A is assigned to physical memory location 105C. In addition, the fourth virtual memory location (element 3) in virtual vector 123B is also assigned to physical memory location 105C. In a particular embodiment of the invention, multiple virtual memory locations within the same virtual vector may be assigned to the same physical memory location in the Array B 103. For example, two elements of the same virtual vector can be assigned to the same bit in the array.

FIG. 1 also shows a number of destination hosts 143. As indicated by the ellipse, the destinations shown here are not meant to be exhaustive. As shown by a mapping 131, each destination host is randomly and uniformly assigned to virtual memory locations in the virtual vectors 123A-B. For example, Dst1 is assigned to virtual memory location 125C, the third virtual memory location in virtual vector 123A. In this embodiment, each destination host is assigned to the same relative position in each virtual vector. Thus, Dst1 is also assigned to the third virtual memory location in virtual vector 123B. In alternative embodiments, destination hosts may be assigned differently for each virtual vector. In a further embodiment of the invention, multiple destinations may be assigned to the same virtual memory location within a virtual vector.

Based on the assignment of destinations to virtual memory locations and virtual memory locations to physical memory locations, a physical memory location may be determined that is assigned to store information related to a particular contact defined by a destination and source pair. For example, Dst2 is assigned to virtual memory location 125A in virtual vector 123A assigned to $Src_i$. In turn, virtual memory location 125A is assigned to physical memory location 105C. Therefore, information related to a contact between Dst2 and $Src_1$ can be found in physical memory location 105C.

Figure 2:
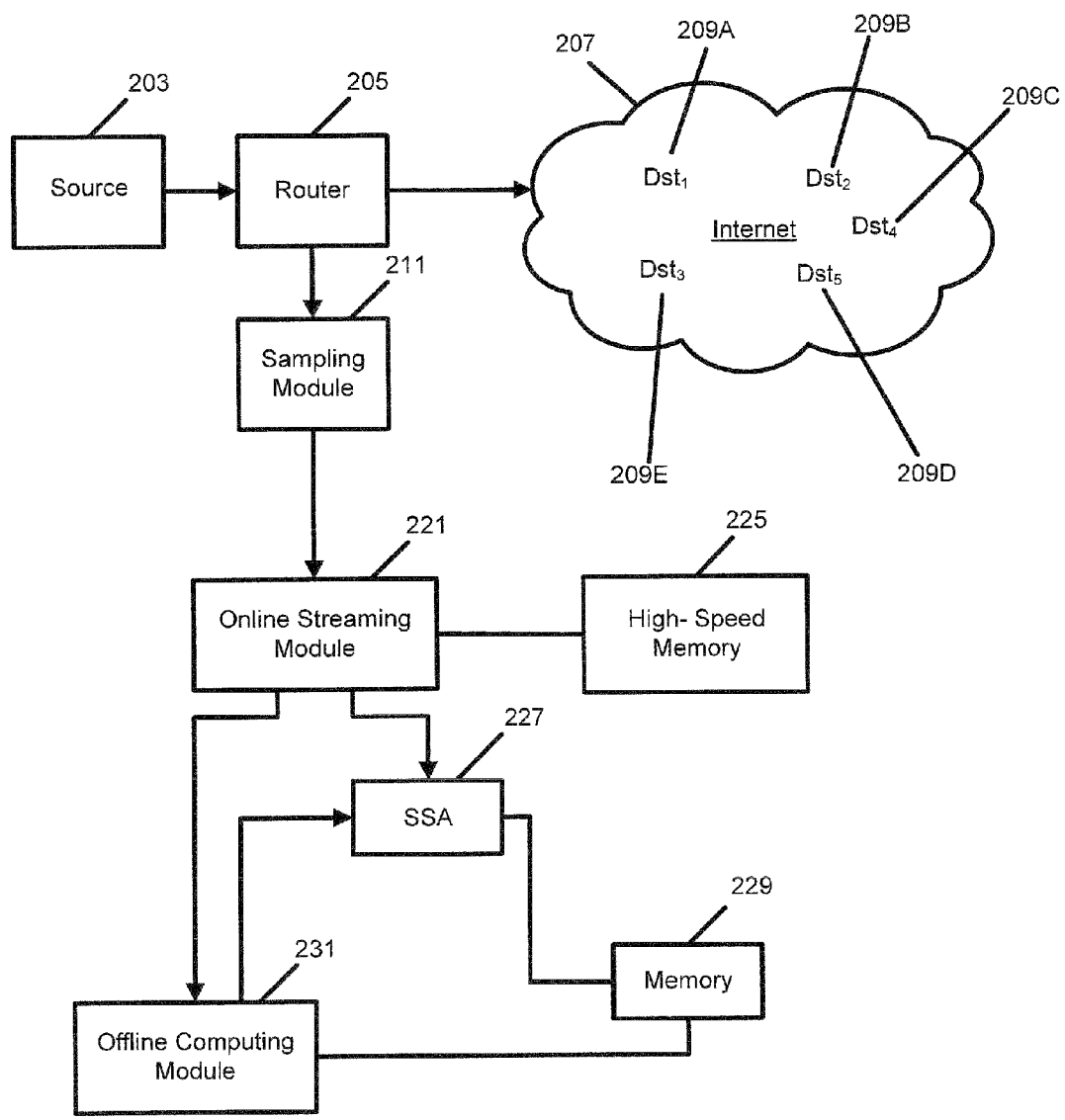
FIG. 2 shows a functional block diagram of a system in accordance with an embodiment of the subject invention.

FIG. 2 shows a functional block diagram of a system in accordance with an embodiment of the subject invention. Various system configurations are possible and not all elements depicted here must be included. Moreover, additional elements may be added to such a system. In this embodiment, a source host 203 passes a network message to a network router 205. The message may be passed using any number of wired or wireless communications technologies as discussed above. In addition, the message may be passed according to any number of communications protocols known in the art. For example, the message may be passed as a TCP/IP packet, a UDP datagram, or an SMS message, among other known protocols.

The message may be intended for any number of destination hosts 209A-E on the Internet 207. The message may also be intended for a destination on a communications network separate and apart from the Internet, such as a Local Area Network. Regardless, in addition to routing the message towards its intended destination, the router 205 passes the message to a sampling module 211. The sampling module then determines whether to pass the message on to an online streaming module 221 for measurement. Various means of sampling network traffic for measurement are known in the art and can be used with the subject invention.

If the message is passed to the online streaming module 221, the message is processed and information related to the message may be stored in a High-Speed Memory 225. Preferably, the message is processed and any information is stored at the line speed of the network so that no sampling is required, but sampling can be used and adjusted so that messages do not back up at the online streaming module 221. In a particular embodiment, information related to the message is stored in a data structure such as one of the data structures described in relation to FIG. 1.

In addition, as new source addresses are encountered, they may be stored for later use by a module for Storing distinct Source Addresses (SSA) 227. As shown here, if the frequency of encountering new source addresses is low, the addresses may be stored in a non-high-speed memory 229.

As time passes, additional messages may be received by the router 205 and processed and stored as discussed above. Later, the message information accumulated in the high-speed memory may be passed to an offline computer module 231 for analysis. Since this processing occurs "offline" it does not have to proceed at the line speed of the network and non-high-speed memory 229 can be utilized for such analysis.

Various network measurements and analysis may be performed using this system. For example, the method of spread estimation described in relation to FIG. 3 may be performed. But this example is merely illustrative. Other measurements and analysis suitable for use with the system will be apparent to those skilled in the art.

Figure 3:
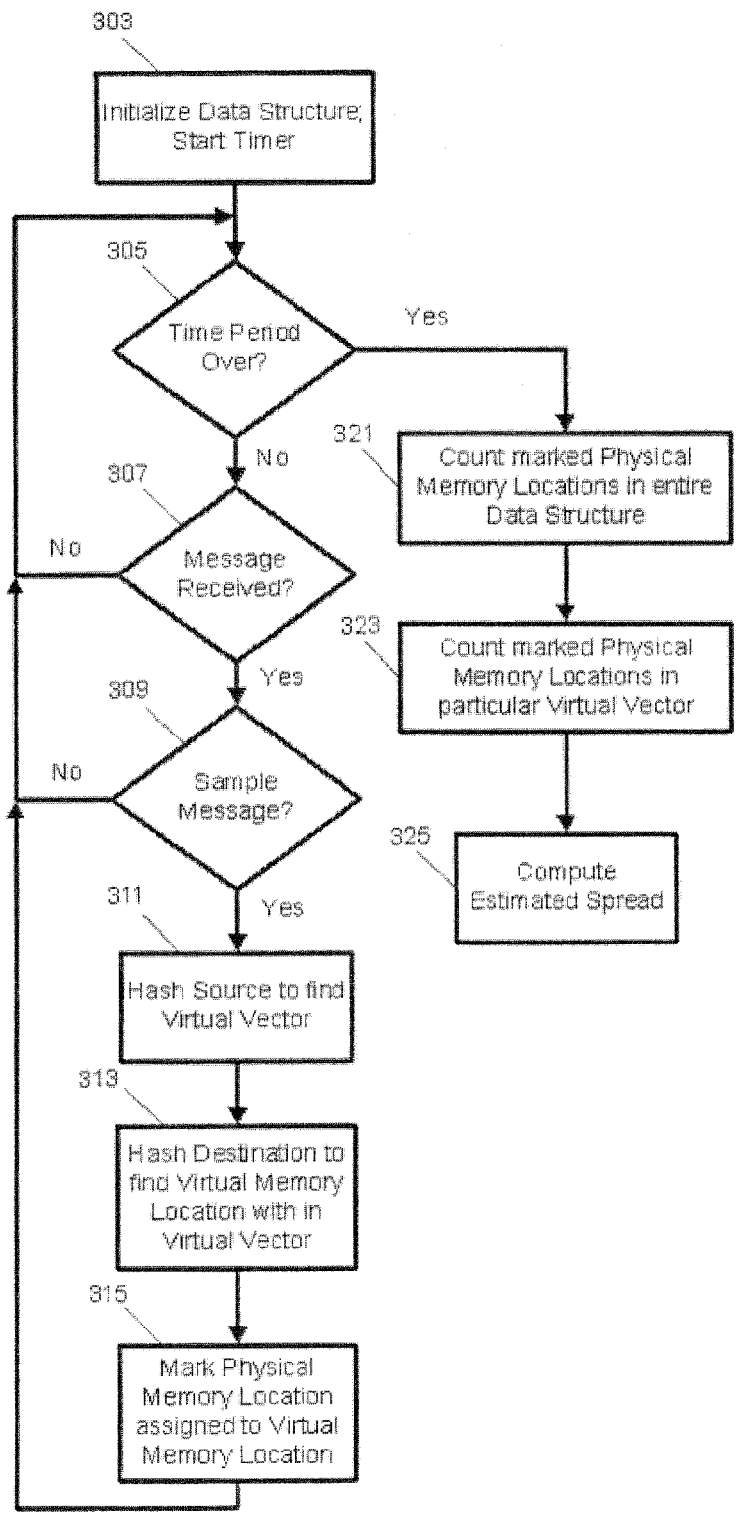
FIG. 3 shows a flow diagram of a method in accordance with an embodiment of the subject invention.

FIG. 3 shows a flow diagram of a method for estimating the spread of a source in accordance with an embodiment of the subject invention. The method employs a data structure for storing information. This data structure may be one of the data structures described in relation to FIG. 1, or another data structure suitable for use with the method. At step 303, the data structure is initialized by clearing any previous marked physical memory locations as discussed below. At step 303, a timer is also started if the spread is to be estimated for a particular measurement period.

At step 305, the timer is checked to see if the measurement period has elapsed. If it has, the method proceeds to an analysis phase at step 321. In a particular embodiment of the subject invention, the analysis phase takes place in an offline computing module such as offline computing module 231 shown in FIG. 2. Otherwise, the method continues to gather contact information in a storage phase by proceeding to step 307. In a particular embodiment of the subject invention, the storage phase takes place in an online streaming module such as online streaming module 221 shown in FIG. 2.

At step 307, the method determines whether a network message has been received. For example, a TCP/IP packet can be received at a router such as router 205 shown in FIG. 2, but, as discussed above, various communications technologies and protocols may be used with the subject invention. If a message has not been received, the method returns to step 305. Otherwise, the method proceeds to process the message received at step 309.

At step 309, the method determines whether the message received is to be sampled. This determination can be made by a sampling module such as sampling module 211. If the message is not to be sampled, the method returns to step 305. Otherwise, the method proceeds to process the message at step 311.

At step 311, information related to a source of the message is used as an input to a hash function in order to find a virtual vector assigned for storing information related to the source. The information related to the source can comprise a network address, a MAC address, a port number, or any other information known in the art for identifying a network element.

Various hash functions are known in the art and may be suitable for use with the subject invention. In a particular embodiment, the hash function used produces a random and uniform mapping such as mapping 111 and the found virtual vector is implemented as described in relation to virtual vector 123A (see FIG. 1). The method then proceeds to step 313.

At step 313, information related to an intended destination of the message is used as an input to a hash function in order to find a virtual memory location (or element) of the virtual vector assigned for storing information related to the destination. As discussed at step 311 in relation to the source, the information related to the destination may be any information known in the art for identifying a network element and various hash functions known in the art may be suitable for this step. In a particular embodiment, the hash function used produces a random and uniform mapping such as mapping 131 (see FIG. 1). The method then proceeds to step 315.

At step 315, a physical memory location assigned to the virtual memory location is found and marked. The marking or flagging may be implemented using various methods known in the art. In a particular embodiment, the physical memory location comprises a bit initially set to zero at step 303 and marking the location comprises setting the bit to one. Once the appropriate physical memory location has been marked, the method returns to step 305.

The storage phase, defined by steps 305-315, proceeds to repeat with the processing of any additional network messages until the time period elapses. At such point the method proceeds to the analysis phase, defined by steps 321-325.

In the analysis phase, the information stored in the previous steps is used to estimate the spread of a particular source on the network. At step 321, the number of marked physical memory locations in the entire data structure is counted. Next at step 323, the number of marked physical memory location assigned to the virtual vector assigned to the particular source is counted. As discussed below, in a particular embodiment of the invention, the virtual vector for the particular source is not counted until step 323. At step 325, the results from steps 321 and 323 are used to estimate the spread of the particular source. In a particular embodiment, the formula (5) discussed below is utilized to estimate the spread. Other spread estimation formulas known in the art may be suitable for use with the subject invention.

As discussed above, certain embodiments of the subject invention include two components: one for storing contacts in virtual vectors, and the other for analyzing the stored contacts. This analysis may be directed to various network measurements. A particular embodiment of these components suitable for spread estimation is termed a Compact Spread Estimator or CSE and is discussed in more detail below.

The subject CSE can use a bit array B of size m (such as array 103), which is initialized to zeros at the beginning of each measurement period. The ith bit in the array is denoted as B[i]. A virtual vector X(src) of size s can be defined for each source address src, where s<<m. The virtual vector consists of s bits pseudo-randomly selected from B. According to an embodiment, hash functions can be used to define the virtual vector as follows:

$$X(\text{src}) = (B[H_0(\text{src})], B[H_1(\text{src})], \ldots, B[H_{s-1}(\text{src})]) \quad (1)$$

where, $H_i$, $0 \leq i \leq s-1$, are different hash functions whose range is $[0 \ldots m-1]$. The hash functions can be generated from a single master hash function $H_M$. This single master hash function ($H_M$) can be used to derive all the hash functions used at various steps of the invention.

$$H_i(\text{src}) = H_M(\text{src} \oplus R[i]) \quad (2)$$

where R is an array of s different random numbers and ⊕ is the XOR operator.

When a contact (src, dst) is received, one bit in B is set. The location of the bit in B is determined by both src and dst. More specifically, the source address src is used to identify a virtual vector X(src), and the destination address dst is used to determine a bit location i* in the virtual vector.

$$i^* = H_M(dst) \bmod s \tag{3}$$

Combining (2) and (3), the i*th bit in vector X(src) is at the following physical location in B:

$$H_i^*(src) = H_M(src \oplus R[i^*]) = H_M(src \oplus R[H_M(dst) \bmod s]).$$

Hence, to store the contact (src, dst), CSE performs the following assignment:

$$B[H_M(src \oplus R[H_M(dst) \bmod s])] := 1. \tag{4}$$

Accordingly, the assignment of destinations hosts to virtual vector elements can be uniformly random throughout the virtual vector, and the same for each virtual vector. Thus, the noise can effectively be the same everywhere, which allows for easy removal (e.g., by filtering).

In embodiments of the subject invention, setting one bit by function (4) is the only thing done when storing a contact. Performing function (4) can take two hash operations and one memory access. The source's virtual vector, as defined in relation (1), may not be explicitly computed until the spread estimation is performed on an offline computing module such as offline computing module 231 (see FIG. 2). The bit, which is physically at location $H_M(src \oplus R[H_M(dst) \bmod s])$ is logically considered as a bit at location $(H_M(dst) \bmod s)$ in the virtual vector X(src). Note that duplicate contacts will be automatically filtered because they are setting the same bit and hence have no impact on the information stored in B. Multiple distinct contacts may also set the same physical bit. But these collisions can be accounted for by the spread estimation formula discussed next.

At the end of the storage phase, the spread of a source src, i.e., the number of distinct contacts that src makes in the period, can be queried. Let k be the actual spread of src. Accordingly, in an embodiment of the subject invention, equation (5) is used to compute the estimated spread $\hat{k}$ of src:

$$\hat{k} = s \cdot \ln(V_m) - s \cdot \ln(V_s) \tag{5}$$

where $V_m$ is the fraction of bits in B whose values are zeros and $V_s$ is the fraction of bits in X(src) whose values are zeros. The value of $V_m$ and $V_s$ can be found by counting zeros in B and X(src), respectively. The first item, $(-s \cdot \ln(V_m))$, captures the noise, which is uniformly distributed in B and thus does not change for different sources (see also relations (12) and (14) below). The second item, $(-s \cdot \ln(V_s))$, is the estimated number of contacts that are stored in X(src), including the contacts made by src and the noise.

In an embodiment of the subject invention, queries are performed after B is copied from the router's high-speed memory, such as high-speed memory 225 (see FIG. 2), to an offline computer in order to avoid interfering with the online operations.

For a further understanding of equation (5), its mathematical derivation is provided below. Its accuracy and variance will be analyzed in the next section.

Some additional notations are given as follows. Let n be the number of distinct contacts from all sources during the measurement period, $U_m$ be the random variable for the number of '0' bits in B, and $U_s$ be the random variable for the number of '0' bits in the virtual vector X(src). Thus, $$V_m = \frac{U_m}{m} \text{ and } V_s = \frac{U_s}{s}.$$

Let $A_j$ be the event that the jth bit in X(src) remains '0' at the end of the measurement period and $1_{A_j}$ be the corresponding indicator random variable. First, the probability for $A_j$ to occur and the expected value of $U_s$ are derived. For an arbitrary bit in X(src), each of the k contacts made by src has a probability of $$\frac{1}{s}$$

to set the bit as one, and each of the contacts made by other sources has a probability of $$\frac{1}{m}$$

to set it as one. All contacts are independent of each other when setting bits in B. Hence, $$Prob\{A_j\} = \left(1 - \frac{1}{m}\right)^{n-k} \left(1 - \frac{1}{s}\right)^k, \quad \wedge j \in [0 \ldots s-1].$$

Since $U_s$ is the number of '0' bits in the virtual vector, $$U_s = \sum_{j=0}^{s-1} 1_{A_j}.$$

Hence, $$\begin{aligned}
E(V_s) &= \frac{1}{s} E(U_s) = \frac{1}{s} \sum_{j=0}^{s-1} E(1_{A_j}) = \frac{1}{s} \sum_{j=0}^{s-1} Prob\{A_j\} \\
&= \left(1 - \frac{1}{m}\right)^{n-k} \left(1 - \frac{1}{s}\right)^k \tag{6} \\
&\simeq e^{-\frac{n-k}{m}} e^{-\frac{k}{s}}, \text{ as } (n-k), m, k, s \to \infty \\
&\simeq e^{-\frac{n}{m} - \frac{k}{s}} \text{ as } k \ll m \tag{7}
\end{aligned}$$

The above equation can be rewritten as $$k \simeq -s \cdot \frac{n}{m} - s \cdot \ln(E(V_s)). \tag{8}$$

Since the bits in any virtual vector are selected from B uniformly at random, the process of storing n contacts in the virtual vectors is to set n bits randomly selected (with replacement) from a pool of m bits. The mathematical relation between n and m has been given by Whang et al. in a database context as follows:

$$n \simeq -m \cdot \ln(E(V_m)) \quad (9)$$

where $$E(V_m) = \left(1 - \frac{1}{m}\right)^n \quad (10)$$

K. Whang, B. Vander-Zanden, and H. Taylor, "A Linear Time Probabilistic Counting Algorithm for Database Applications," *ACM Transactions on Database Systems*, June 1990. Hence equation (8) can be written as $$k \simeq s \cdot \ln(E(V_m)) - s \cdot \ln(E(V_s)) \quad (11)$$

Figure 4:
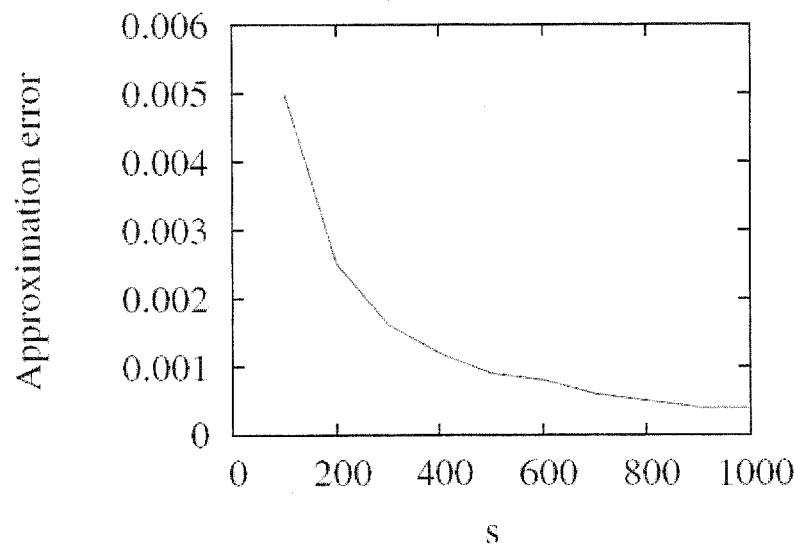
FIG. 4 is a plot showing the expected approximation error of a spread estimator implemented in accordance with an embodiment of the subject invention with a 1 MB bit array and virtual vectors of various sizes s (in bits). The approximation error is shown to be very small when s selected to be reasonably large.

In practice, n and m are likely to be very large numbers, the spread values (k) that are of interest are likely to be large, and s will be chosen large. The approximation errors that are accumulated in equation (11) can be measured as $$\frac{|s \cdot \ln(E(V_m)) - s \cdot \ln(E(V_s)) - k|}{k} = \left| s \cdot \ln\left(\frac{1 - \frac{1}{m}}{1 - \frac{1}{s}}\right) - 1 \right|$$

which is independent of n and k. This error is very small when s is reasonably large. For example, when m=1 MB, as shown in FIG. 4, the error is only 0.25% when s is 200.

Let $k_1 = -s \cdot \ln(E(V_m))$ and $k_2 = -s \cdot \ln(E(V_s))$. Then, equation (11) is rewritten as $k \simeq -k_1 + k_2$. Replacing $E(V_m)$ and $E(V_s)$ by the instance values, $V_m$ and $V_s$, that are obtained from B and X(src) respectively, the following estimation for $k_1$, $k_2$ and k is obtained:

$$\hat{k}_1 = -s \cdot \ln(V_m) \quad (12)$$

$$\hat{k}_2 = -s \cdot \ln(V_s) \quad (13)$$

$$\hat{k} = -\hat{k}_1 + \hat{k}_2 \quad (14)$$

According to Theorem A4 presented by Whang et al. in the database context, $\hat{k}_1$ is the maximum likelihood estimator (MLE) of $k_1$. Following a similar analysis, it is straightforward to see that $\hat{k}_2$ and $\hat{k}$ are the maximum likelihood estimators of $k_2$ and k, respectively. $\hat{k}_1$ is the noise, i.e., the estimated number of contacts made by others but inserted in X(src) due to bit sharing between virtual vectors. $\hat{k}_2$ estimates the total number of contacts stored in X(src), including the noise. The k values that can be accurately estimated should be greater than the standard deviation of the noise $\hat{k}_1$, which can be made very small as further analyzed below.

In a particular embodiment of the subject invention, the spread estimation system incorporates a sampling module, a Compact Spread Estimator (CSE), and a module for Storing distinct Source Addresses, denoted as SSA. The CSE has two sub-modules: one for Storing Contacts, denoted as CSE-SC, and the other for Spread Estimation, denoted as CSE-SE, which has been described above. CSE-SC is located in a high-speed memory of a router, such as high speed memory 225, and CSE-SE is located on an offline computing module answering spread queries, such as offline computing module 231 (see FIG. 2).

As discussed above, a sampling module, such as sampling module 211 of FIG. 2, may be used to handle the mismatch between the line speed and the processing speed of CSE-SC. If CSE-SC cannot keep up with the line speed, the source/destination addresses of each arriving packet can be hashed into a number in a range [0, N). In one embodiment, only if the number is greater than a threshold T(<N), is the contact forwarded to CSE-SC. The threshold can be adjusted to match CSE-SC with the line speed. The final estimated spread of a source will become $$\hat{k} \frac{N}{T}.$$

Various other sampling techniques are known in the art and can be used with the subject invention.

Most applications of spread estimation, such as those discussed in the background section, are really only interested in high-spread sources. For such sources, in accordance with an embodiment of the invention, SSA does not need to be invoked for each packet. For example, in a particular embodiment, when CSE-SC stores information at a particular physical memory location in B, it first checks whether such information has already been stored at that physical memory location. If so, the source address is not passed to the SSA module for storage. In this embodiment, SSA operates infrequently compared with CSE-SC. First, numerous packets may be sent from a source to a destination in a TCP/UDP session. However, only the first packet may invoke SSA because the rest of the packets will set the same physical memory location. Second, while a source may send thousands or even millions of packets through a router, the number of times its address is passed to SSA will be bounded by s (the number of virtual memory locations in the source's virtual vector). Hence, in this embodiment, SSA can be implemented in the main memory, thanks to its infrequent operation.

For CSE-SE to work, m and s should be chosen large enough such that the noise introduced by other sources does not set all (or most) bits in a virtual vector. Hence, it is unlikely that the address of a high-spread source will not be stored in SSA. For example, even when only 10% of the bits in a virtual vector are not set by noise, for a source making 100 distinct contacts, the probability for none of its contacts being mapped to those 10% bits is merely $(1-10\%)^{100}=2.65 \times 10^{-5}$.

Mathematical Analysis

The mean and variance of $\hat{k}_1$ and $\hat{k}_2$ are calculated in section A. In section B, these results are utilized to assess the accuracy and bias of spread estimation equation (5).

A. Mean and Variance of $\hat{k}_1$ and $\hat{k}_2$

After setting n bits randomly selected from a pool of m bits, $\hat{n} = -m \ln V_m$ can be used to estimate the value of n and gives the following results:

$$E(\hat{n}) = E(-m \ln V_m) \simeq n + \frac{e^{\frac{n}{m}} - \frac{n}{m} - 1}{2}$$

$$\text{Var}(\hat{n}) = \text{Var}(-m \ln V_m) \simeq m\left(e^{\frac{n}{m}} - \frac{n}{m} - 1\right).$$

Since $\hat{k}_1 = -s \cdot \ln(V_m)$, we have $$E(\hat{k}_1) \simeq \frac{s}{m}\left(n + \frac{e^{\frac{n}{m}} - \frac{n}{m} - 1}{2}\right) \quad (15)$$

$$\text{Var}(\hat{k}_1) \simeq \frac{s^2}{m}\left(e^{\frac{n}{m}} - \frac{n}{m} - 1\right). \quad (16)$$

If an appropriate memory size m is chosen, such that m=O(n) and $$e^{\frac{n}{m}} - \frac{n}{m} - 1$$

is negligible when comparing with n, then $$E(\hat{k}_1) \simeq s\frac{n}{m},$$

which is indeed the average noise that a virtual vector of size s will receive when all n contacts are evenly distributed across the space of m bits. When m is large, the standard deviation, which is the square root of $\text{Var}(\hat{k}_1)$, is insignificant when comparing with the mean.

Next, $\hat{k}_2$ is considered. Let $$\alpha = \frac{n}{m} + \frac{k}{s}.$$

Thus, Eq (7) can be rewritten as $$E(V_s) \cong e^{-\alpha} \quad (17)$$

The variance of $V_s$ can be derived as follows. The probability for $A_i$ and $A_j$ $\forall i, j \in [0 \ldots s-1]$, $i \neq j$, to happen simultaneously is:

$$\text{Prob}\{A_i \cap A_j\} = \left(1 - \frac{2}{m}\right)^{n-k}\left(1 - \frac{2}{s}\right)^k.$$

Since $$V_s = \frac{U_s}{s} \text{ and } U_s = \sum_{j=1}^{s} 1_{A_j},$$

it follows that:

$$E(V_s^2) = \frac{1}{s^2}E\left(\left(\sum_{j=1}^{s}1_{A_j}\right)^2\right)$$

$$= \frac{1}{s^2}E\left(\sum_{j=1}^{s}1_{A_j}^2\right) + \frac{2}{s^2}E\left(\sum_{1 \le i < j \le s}1_{A_j}1_{A_j}\right)$$

$$= \frac{1}{s}\left(1-\frac{1}{m}\right)^{n-k}\left(1-\frac{1}{s}\right)^k + \frac{s-1}{s}\left(1-\frac{2}{m}\right)^{n-k}\left(1-\frac{2}{s}\right)^k.$$

Based on (6) and the equation above, it follows that:

$$\text{Var}(V_s) = E(V_s^2) - E(V_s)^2 \quad (27)$$

$$= \frac{1}{s}\left(1-\frac{1}{m}\right)^{n-k}\left(1-\frac{1}{s}\right)^k + \frac{s-1}{s}\left(1-\frac{2}{m}\right)^{n-k}\left(1-\frac{2}{s}\right)^k -$$

$$\left(1-\frac{1}{m}\right)^{2(n-k)}\left(1-\frac{1}{s}\right)^{2k}$$

$$= \frac{1}{s}\left(\left(1-\frac{1}{m}\right)^{n-k}\left(1-\frac{1}{s}\right)^k - \left(1-\frac{2}{m}\right)^{n-k}\left(1-\frac{2}{s}\right)^k\right) +$$

$$\left(1-\frac{2}{m}\right)^{n-k}\left(1-\frac{2}{s}\right)^k - \left(1-\frac{1}{m}\right)^{2(n-k)}\left(1-\frac{1}{s}\right)^{2k} \simeq$$

$$\frac{1}{s}(e^{-\alpha} - e^{-2\alpha}) + e^{-2\frac{n-k}{m} - 2\frac{k}{s}}\left(\frac{-k}{s^2}\right) \simeq$$

$$\frac{1}{s}\left(e^{-\alpha} - e^{-2\alpha} - \frac{k}{s}e^{-2\alpha}\right).$$

Therefore, $\text{Var}(V_s)$ is:

$$\text{Var}(V_s) \simeq \frac{1}{s}\left(e^{-\alpha} - e^{-2\alpha} - \frac{k}{s} \cdot e^{-2\alpha}\right). \quad (18)$$

In (13), $\hat{k}_2$ is a function of $V_s$. The right-hand side of (13) can be expanded by its Taylor series about $q = E(V_s) \cong e^{-\alpha}$:

$$\hat{k}_2(V_s) = s \cdot \left(\alpha - \frac{V_s - q}{q} + \frac{(V_s - q)^2}{2q^2} - \frac{(V_s - q)^3}{3q^3} + \ldots\right) \quad (19)$$

Since $q = E(V_s)$, the mean of the second term in (19) is 0. Therefore, the first three terms are kept when computing the approximated value for $E(\hat{k}_2)$.

$$E(\hat{k}_2) \simeq s \cdot \left(\alpha + \frac{1}{2q^2}E((V_s - q)^2)\right)$$

$E((V_s - q)^2) = \text{Var}(V_s)$ by definition. Applying (18), it follows that:

$$E(\hat{k}_2) \simeq s \cdot \left(\alpha + \frac{e^\alpha - 1 - \frac{k}{s}}{2s}\right) \quad (20)$$

If s is large enough such that $$\frac{e^\alpha - 1\frac{k}{s}}{2s}$$

is negligible, then $$E(\hat{k}_2) \cong s\alpha = s\frac{n}{m} + k.$$

Recall that $$E(\hat{k}_1) \simeq s\frac{n}{m}.$$

Hence, $E(\hat{k})=E(\hat{k}_1)+E(\hat{k}_2)\simeq k$. In the next section, the mean of $\hat{k}$ is characterized more precisely and it's deviation from the true value of k is analyzed.

To derive the variance of $\hat{k}_2$, the first two items on the right-hand side of (19) are kept:

$$\text{Var}(\hat{k}_2) \simeq s^2 \cdot \text{Var}\left(\alpha - \frac{V_s - q}{q}\right) = \frac{s^2}{q^2} \cdot \text{Var}(V_s) \simeq s\left(e^\alpha - \frac{k}{s} - 1\right) \quad (21)$$

The combined impact of $V(\hat{k}_1)$ and $V(\hat{k}_2)$ on the variance of $\hat{k}$ is studied next.

B. Estimation Bias and Standard Deviation

Based on the means of $\hat{k}_1$ and $\hat{k}_2$ derived previously, the mean of the spread estimation $\hat{k}$ is obtained by:

$$E(\hat{k}) = E(\hat{k}_2) - E(\hat{k}_1) \simeq s\left(\alpha + \frac{e^\alpha - 1 - \frac{k}{s}}{2s}\right) - \frac{s}{m}\left(n + \frac{e^{\frac{n}{m}} - \frac{n}{m} - 1}{2}\right) \quad (22)$$

The estimation bias is $$E(\hat{k} - k) \simeq \frac{m\left(e^\alpha - 1 - \frac{k}{s}\right) - s\left(e^{\frac{n}{m}} - \frac{n}{m} - 1\right)}{2m} \quad (23)$$

As an example, for n=10,000,000, m=2 MB, and s=400, 600 or 800, the bias with respect to k is shown in Table I. It is very small when comparing with the true spread k.

TABLE 1

BIAS WITH RESPECT TO S AND K

| | k = 100 | 200 | 300 | 400 | 500 | 600 | 700 | 800 |
|---|---|---|---|---|---|---|---|---|
| s = 400 | 0.54 | 0.77 | 1.05 | 1.47 | 2.04 | 2.82 | 3.85 | 5.21 |
| s = 600 | 0.49 | 0.60 | 0.75 | 0.93 | 1.17 | 1.47 | 1.83 | 2.28 |
| s = 800 | 0.47 | 0.54 | 0.63 | 0.75 | 0.88 | 1.05 | 1.24 | 1.47 |

The variance of $\hat{k}$ is $$\text{Var}(\hat{k}) = \text{Var}(\hat{k}_1) + \text{Var}(\hat{k}_2) - 2\text{Cov}(\hat{k}_1, \hat{k}_2) \quad (24)$$

$$= \text{Var}(\hat{k}_1) + \text{Var}(\hat{k}_2) + 2[E(\hat{k}_1)E(\hat{k}_2) - E(\hat{k}_1\hat{k}_2)].$$

$\text{Var}(\hat{k}_1)$, $\text{Var}(\hat{k}_2)$, $E(\hat{k}_1)$, and $E(\hat{k}_2)$ have already been derived. To derive $E(\hat{k}_1\hat{k}_2)$, recall that $\hat{k}_1=s\cdot(-\ln(V_m))$ and $\hat{k}_2=s\cdot(-\ln(V_s))$. The terms $-\ln(V_m)$ and $-\ln(V_s)$ may be expanded by their Taylor series about $$p = e^{-\frac{n}{m}}$$

and $q=e^{-\alpha}$, respectively.

$$E(\hat{k}_1\hat{k}_2) = s^2 E((-\ln(V_m))(-\ln(V_s))) \quad (25)$$

$$= s^2 E\left(\left(\frac{n}{m} - \frac{V_m - p}{p} + \frac{(V_m - p)^2}{2p^2} - \cdots\right) \cdot \left(\alpha - \frac{V_s - q}{q} + \frac{(V_s - q)^2}{2q^2} - \cdots\right)\right)$$

$$\simeq s^2 \left[\begin{array}{c}\frac{n}{m} E\left(\alpha - \frac{V_s - q}{q} + \frac{(V_s - q)^2}{2q^2}\right) + \\ \alpha E\left(\frac{n}{m} - \frac{V_m - p}{p} + \frac{(V_m - p)^2}{2p^2}\right) - \frac{n}{m}\alpha\end{array}\right]$$

$$= s^2 \left[\begin{array}{c}\frac{n}{m}\left(\alpha + \frac{e^\alpha - 1 - \frac{k}{s}}{2s}\right) + \\ \frac{\alpha}{m}\left(n + \frac{e^{\frac{n}{m}} - \frac{n}{m} - 1}{2}\right) - \frac{n}{m}\alpha\end{array}\right]$$

$$= s^2 \left[\frac{n}{m}\alpha + \frac{\frac{n}{m}\left(e^\alpha - 1 - \frac{k}{s}\right)}{2s} + \frac{\alpha\left(e^{\frac{n}{m}} - \frac{n}{m} - 1\right)}{2m}\right]$$

From (15), (16), (20), (21), (24), and (25), the closed-form approximation of $\text{Var}(\hat{k})$ may be obtained. The standard deviation, divided by k to show the relative value, is $$StdDev\left(\frac{\hat{k}}{k}\right) = \frac{\sqrt{\text{Var}(\hat{k})}}{k} \quad (26)$$

A number of approximations have been made, particularly, the truncation of less significant items in the Tayler series, when deriving $\text{Var}(\hat{k}_1)$, $\text{Var}(\hat{k}_2)$, $E(\hat{k}_1)$ and $E(\hat{k}_2)$, and $E(\hat{k}_1\hat{k}_2)$. The standard deviation embodies all these approximations. Next, with reference to FIGS. 6-9, the numerical values of the standard deviation calculated from (26) are presented alongside the values obtained from experiment. The results demonstrate that the analytical approximations only introduce minor error when the source spread is not too small.

Experimental Results

CSE was evaluated through experiments using real Internet traffic traces. In most experiments, the memory size, when averaging over all sources appearing in the input stream of contacts, ranges from 1.15 bits per source to 9.21 bits per source. Existing estimators that keep per-flow or per-source state, see e.g., C. Estan, G. Varghese, and M. Fish, "Bitmap Algorithms for Counting Active Flows on High-Speed Links," *IEEE/ACM Trans. on Networking*, vol. 14, no. 5, October 2006; S. Venkatataman, D. Song, P. Gibbons, and A. Blum, "New Streaming Algorithms for Fast Detection of Superspreaders," *Proc. of NDSS '05*, February 2005, will not work here as explained above. The only previous spread estimator that can be implemented in such a small memory is OSM; however, as the experimental results demonstrate, OSM is inaccurate at this size. Hence, CSE is useful in that it substantially reduces the memory requirement for spread estimation while still providing accurate estimates.

Embodiments of CSE describe above make two hash operations and one memory access for storing each contact, whereas OSM makes l+1 hash operations and/memory accesses, where l is typically three. Thus, the speed of CSE's online operation is clearly advantageous over OSM. The evaluation of the experimental results will focus on the accuracy of spread estimates obtained by CSE and OSM.

A. Experiment Setup

Inbound packet header traces were collected through Cisco's NetFlow from the main gateway at the University of Florida for six days from Apr. 1 to 6, 2005. CSE and OSM were implemented and executed with the input of the six days' data. As the experimental results obtained were similar for all six days, the results for only the first day are presented here.

Figure 5:
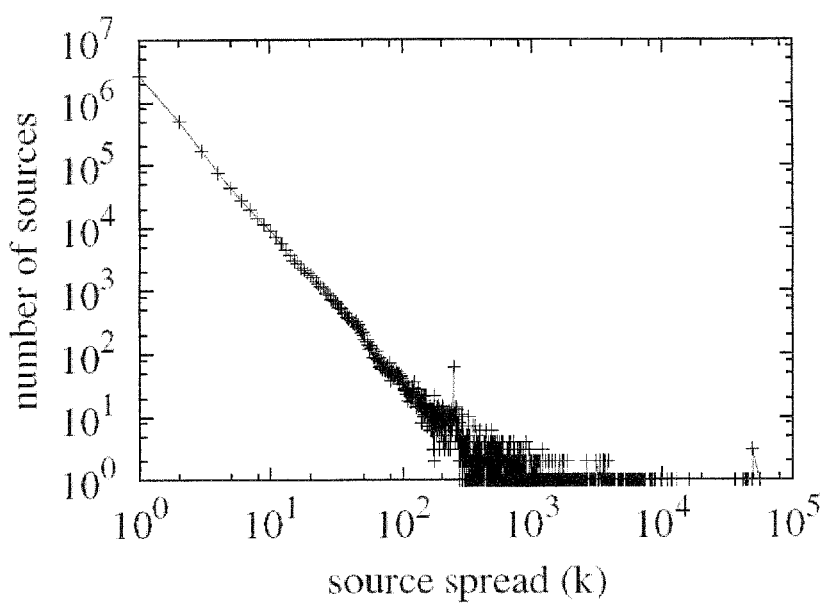
FIG. 5 is a plot of experimental data showing the number of sources at each spread value k in log scale. Each point shows the number of sources having a certain spread value.
Figure 6A:
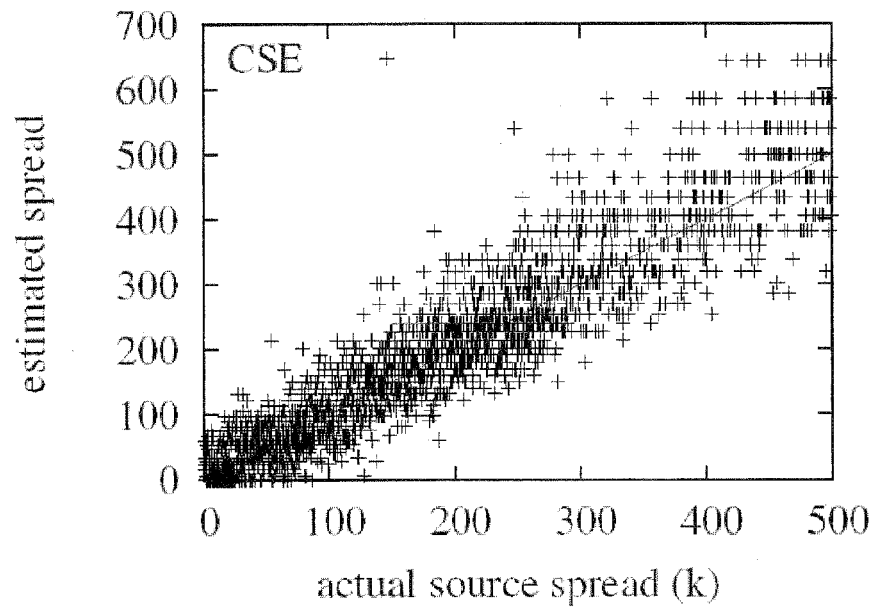
FIGS. 6-9 are plots of experimental data showing the accuracy and bias of particular embodiments of the subject invention (CSE) and a prior art spread estimator (OSM) when the memory allocated was 0.5 MB (FIGS. 6A-6D), 1 MB (FIGS. 7A-7D), 2 MB (FIGS. 8A-8D) and 4 MB (FIGS. 9A-9D). Each point in the A plots of the figures (CSE) or the B plots of the figures (OSM) represents a source, whose x coordinate is the true spread k and y coordinate is the estimated spread $\hat{k}$. The C plots of the figures show the bias of CSE and OSM, which is the measured $E(\hat{k}-k)$ with respect to k. The D plots of the figures show the standard deviation, which is the measured $$\frac{\sqrt{Var(\hat{k})}}{k}$$
Figure 6B:
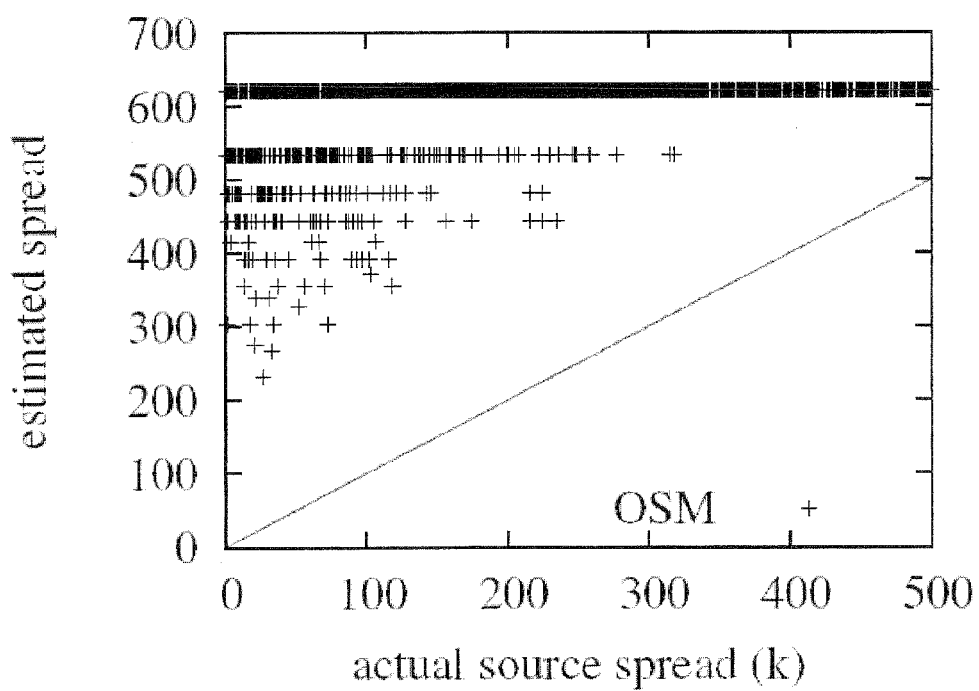
Figure 6C:
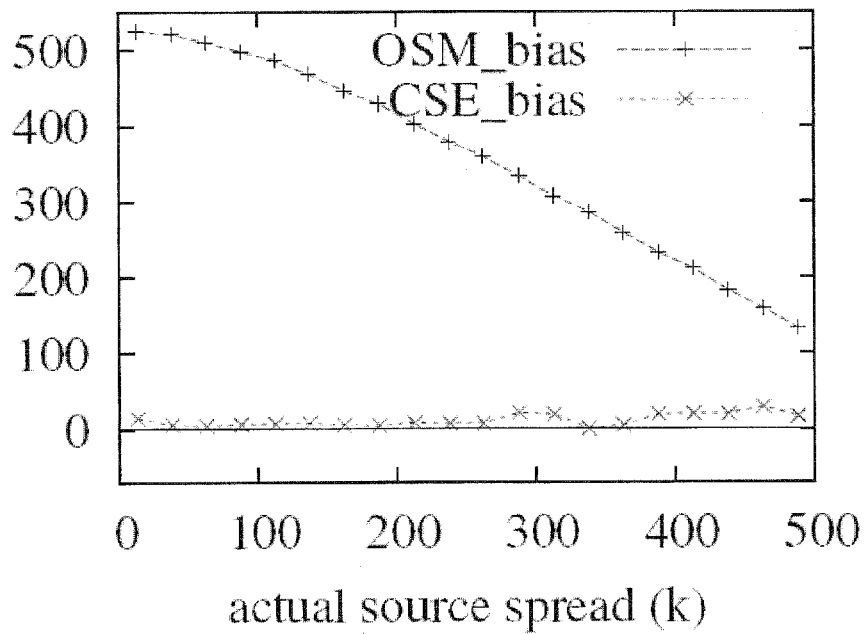
Figure 6D:
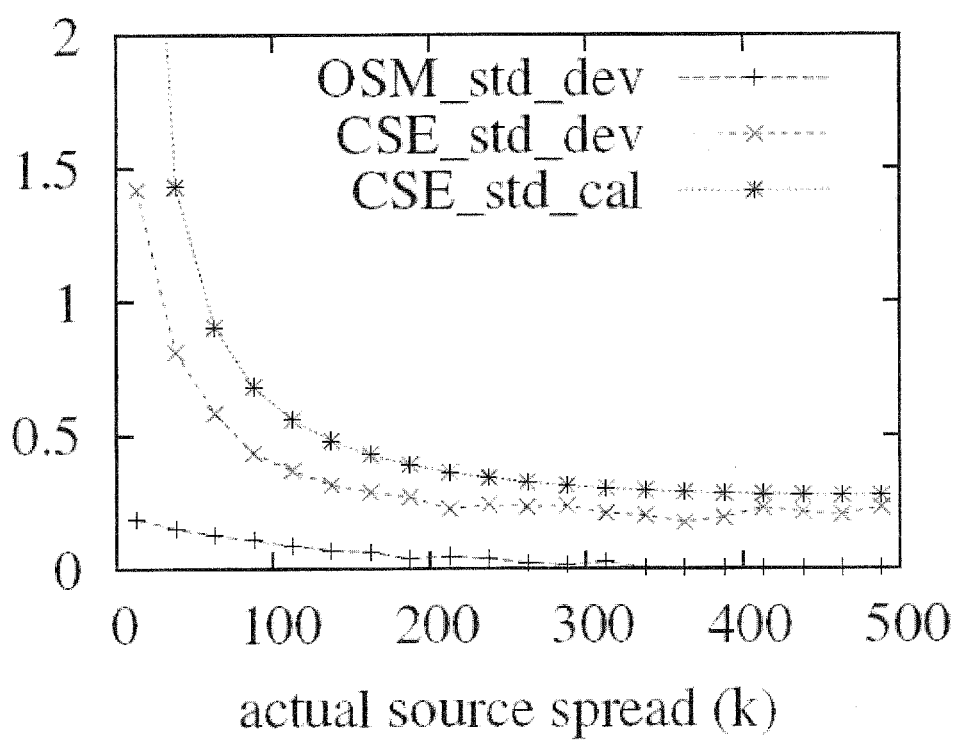
Figure 7A:
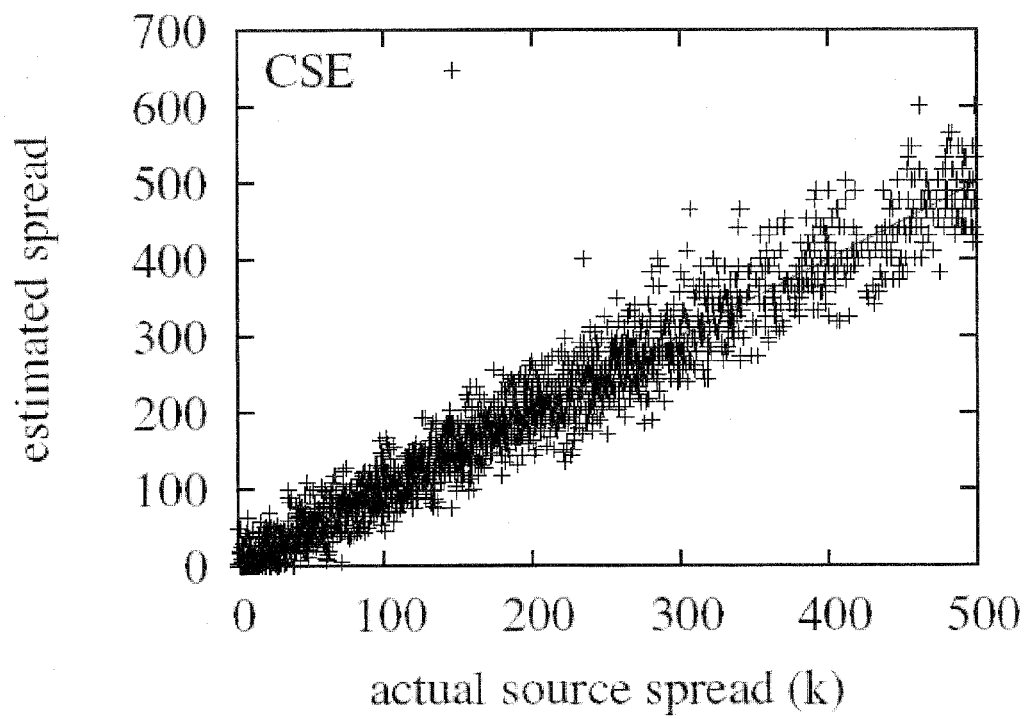
Figure 7B:
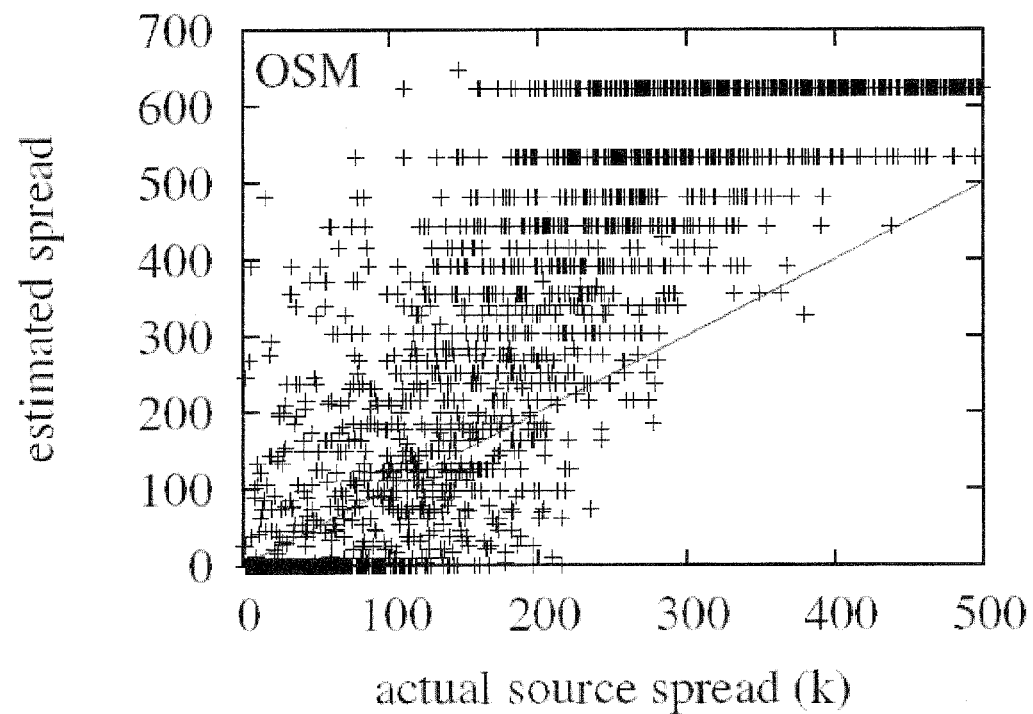
Figure 7C:
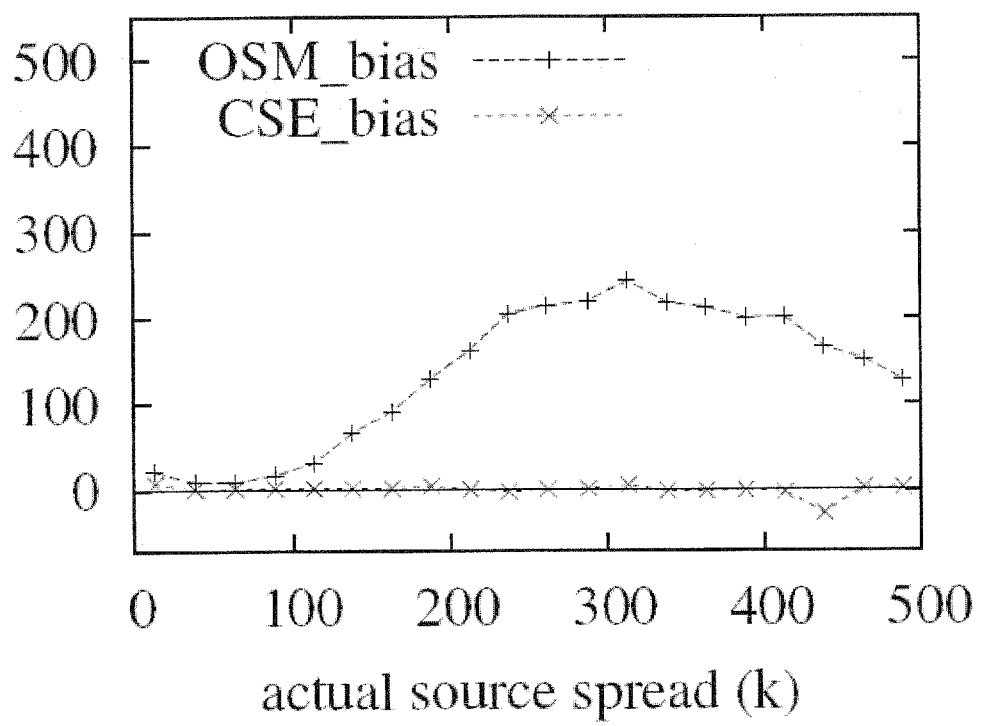
Figure 7D:
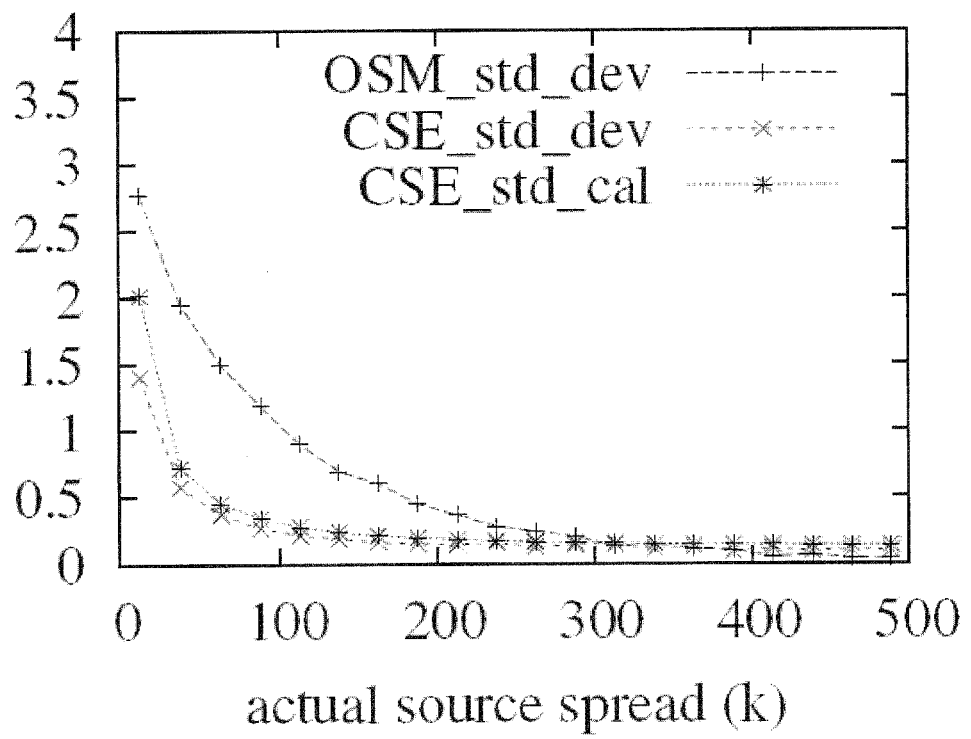
Figure 8A:
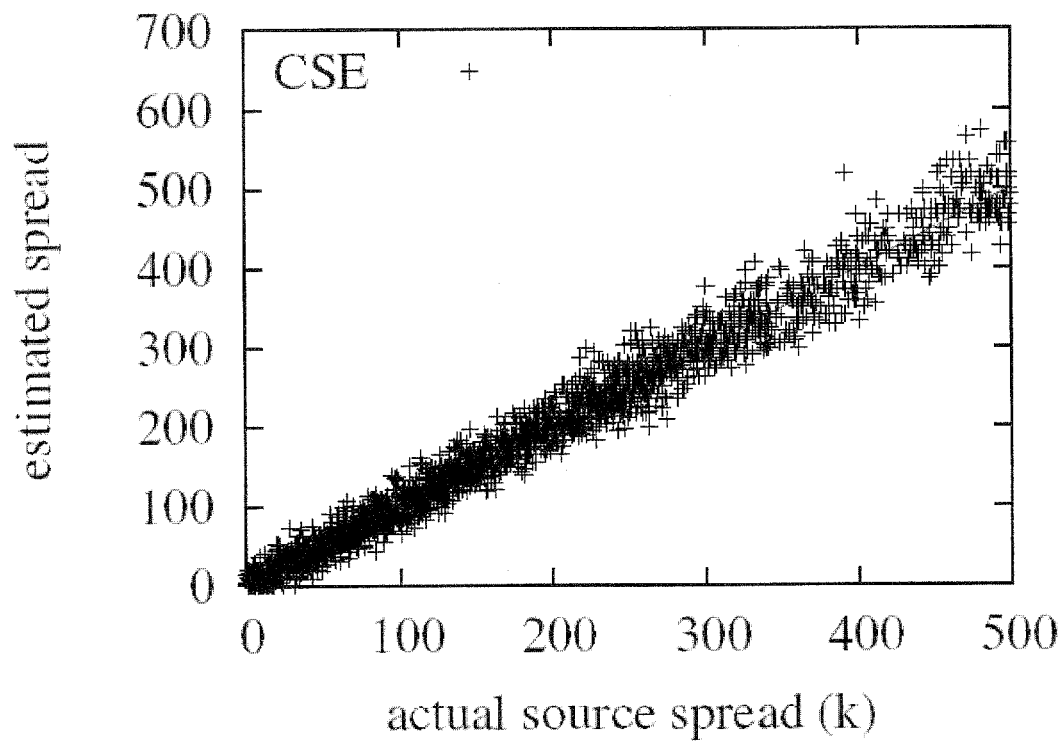
Figure 8B:
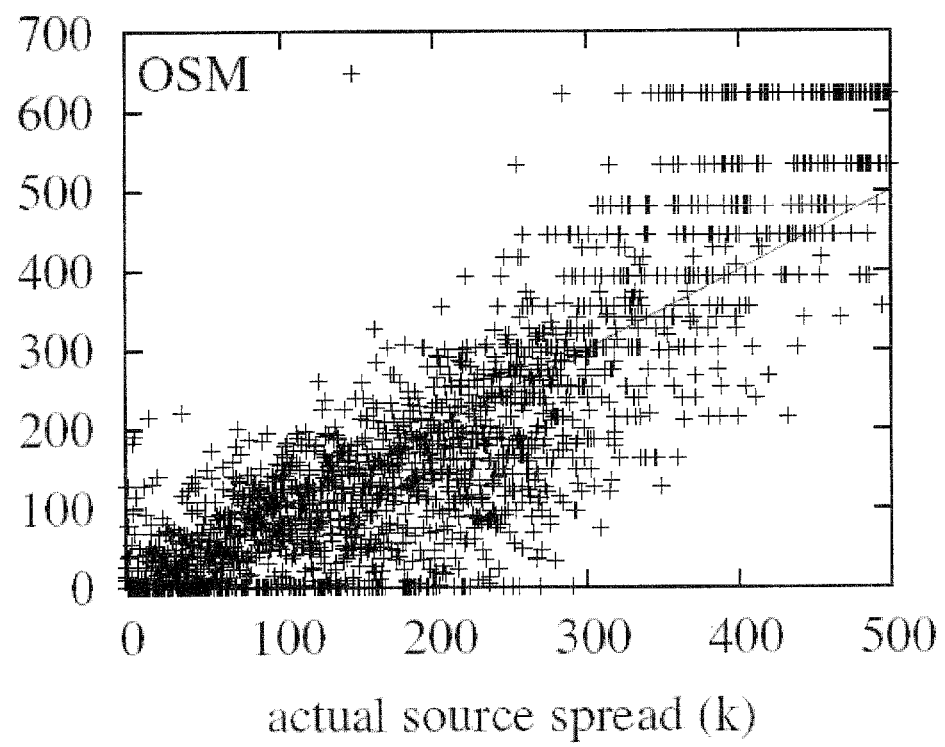
Figure 8C:
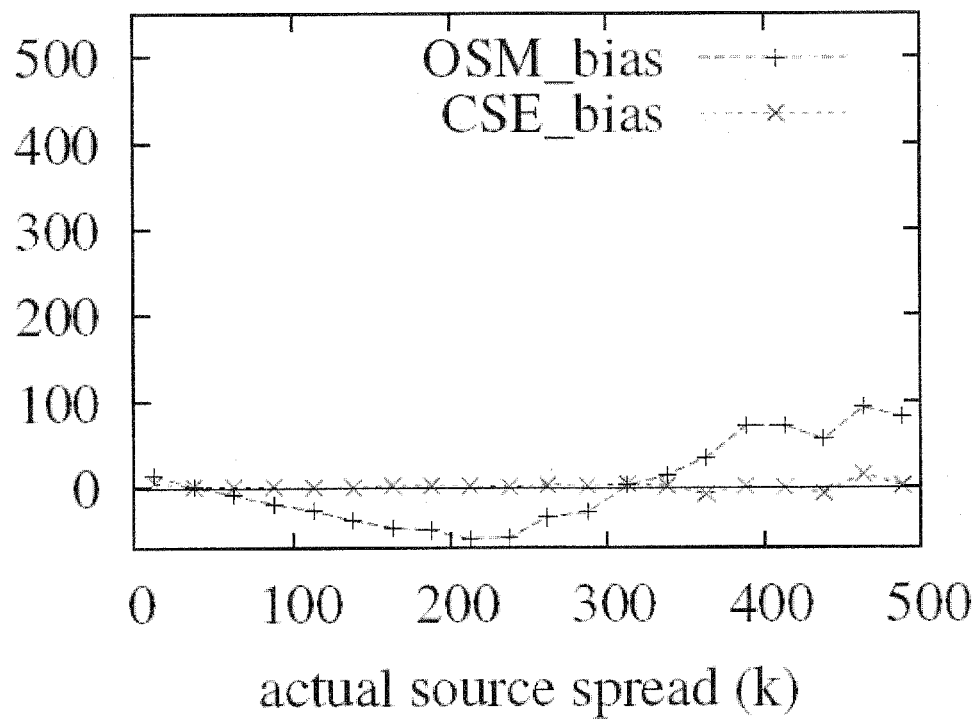
Figure 8D:
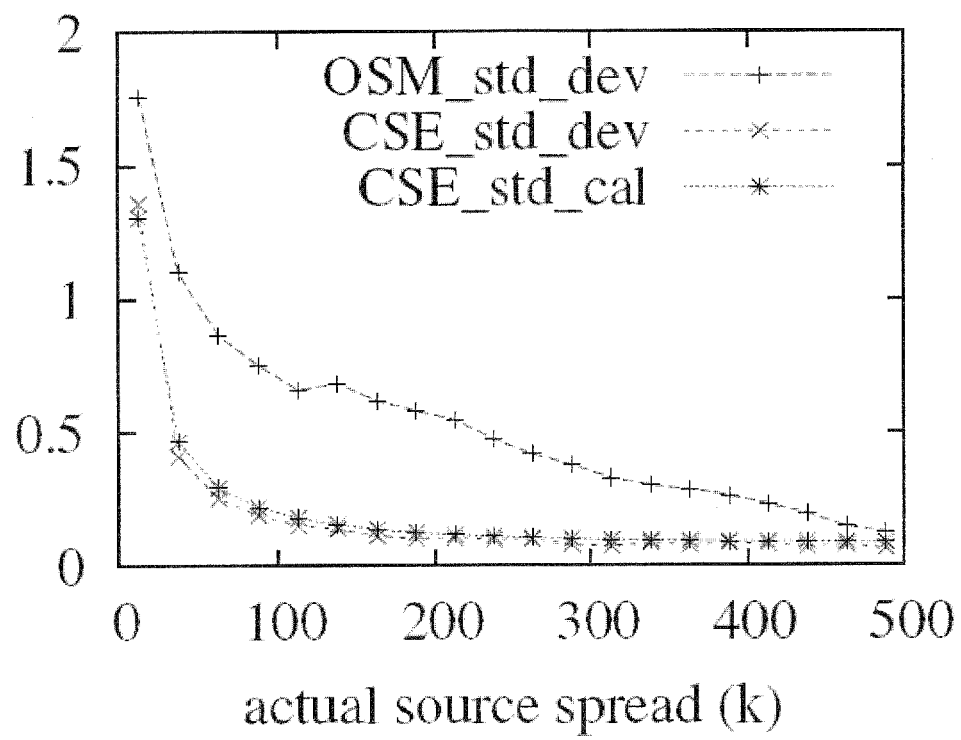
Figure 9A:
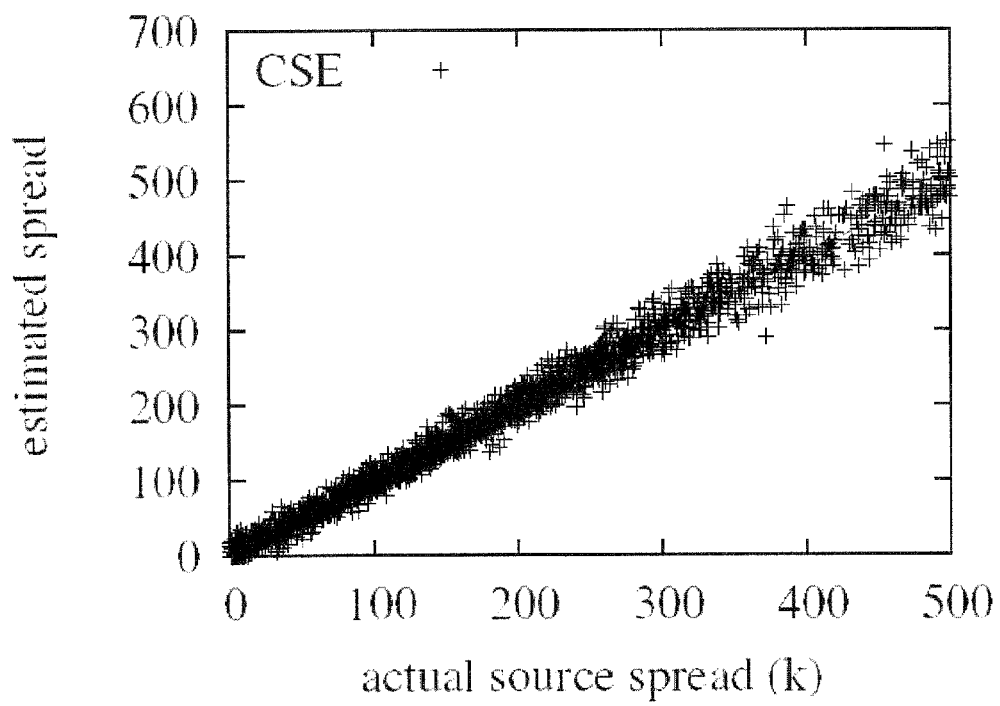
Figure 9B:
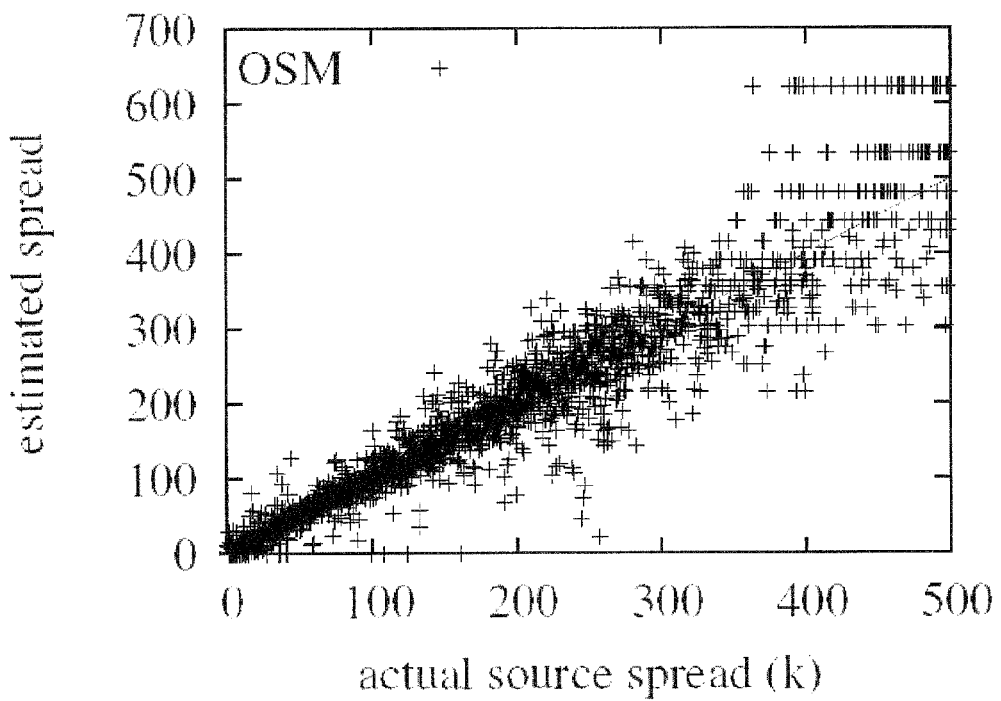
Figure 9C:
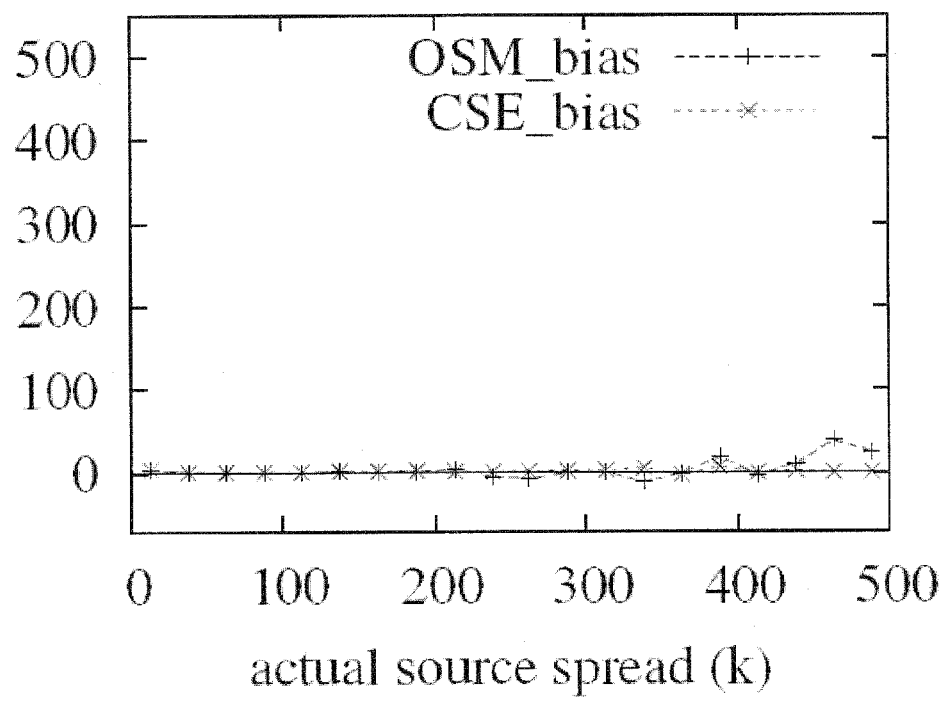
Figure 9D:
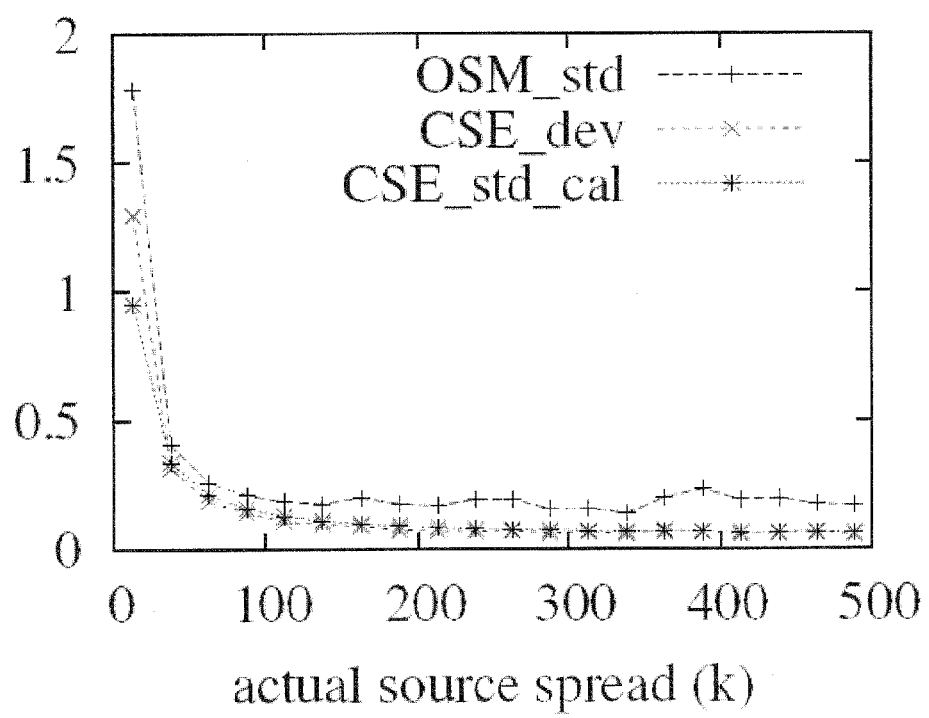

In the embodiments of CSE and OSM implemented for the experiment, the source of a contact is identified by the IP address of the packet sender, and the destination by the IP address of the receiver. The traffic trace on April 1 has 3,558,510 distinct source IP addresses, 56,234 distinct destination addresses, and 10,048,129 distinct contacts. The average spread per source is 2.84; namely, each source makes 2.84 distinct contacts on average. FIG. 5 shows the number of sources at each spread value in log scale. The number of sources decreases exponentially as the spread value increases from 1 to around 500. After that, there is zero, one or a few sources for each spread value.

The same amount of memory was always allocated to CSE and OSM for fair comparison. In each experiment, the contacts extracted from the traffic trace were fed to CSE or OSM, which stores the contact information in its data structure (located in SRAM or high-speed cache memory when deployed in a real router). The source addresses are recorded in a separate data structure (located in the main memory because the operations for recording source addresses are performed infrequently as explained above). After all contacts are processed, CSE or OSM were used to estimate the spread of each recorded source (which preferably is performed on an offline computer such as the network management center in practice).

B. Accuracy of Spread Estimation

The first set of experiments compares CSE and OSM in the accuracy of their spread estimations. CSE has two configurable parameters: the memory size m and the virtual vector size s. Four experiments were performed with m=0.5 MB, 1 MB, 2 MB, and 4 MB, respectively. In each experiment, a value for s was selected that minimizes the standard deviation as defined in (26) at k=250, which is the middle point of the range (0.500) in which the spreads of most sources fall (see FIG. 5).

OSM also has two configurable parameters: the memory size m and the column size (the number of rows in the bit matrix). Zhao et al. do not provide a means to determine the best column size, but suggest that 64 bits are typical. Thus, the performance of OSM under different column sizes was evaluated. After comparison, the column size 128 was selected, as better than or comparable with other sizes.

FIGS. 6-9 present the experimental results when the memory allocated is 0.5 MB (FIGS. 6A-6D), 1 MB (FIGS. 7A-7D), 2 MB (FIGS. 8A-8D), and 4 MB (FIGS. 9A-9D). Each point in the A plots of the figures (for CSE) or the B plots of the figures (for OSM) represents a source, whose x coordinate is the true spread k and y coordinate is the estimated spread $\hat{k}$. The line of $\hat{k}=k$ is also shown. The closer a point is to the line, the more accurate the spread estimation is. To make the A and B plots of the figures legible, when there are too many sources having a certain spread k, five were randomly selected. The C and D plots of the figures present the bias, $E(\hat{k}-k)$, and the standard deviation, $$\frac{\operatorname{Var}(\hat{k})}{k},$$

measured in the experiment, respectively. Because there are too few sources for some spread values in the Internet trace, the horizontal axis is divided into measurement bins of width 25, and the bias and standard deviation is measured in each bin. To verify the analytical results, the standard deviation numerically calculated from (26) and (24) is shown as the curve under title "CSE_std_cal" in the D plots of the figures. The following conclusions can be drawn from the results:

A and B Plots: CSE works far better than OSM when the allocated memory is small (see e.g., FIGS. 6A and 6B for m=0.5 MB and FIGS. 7A and 7B for m=1 MB). As the memory size increases, the performance of OSM improves and approaches toward the performance of CSE.

C and D Plots: Both the bias and the standard deviation of CSE are much smaller than those of OSM. Moreover, the C plots show that OSM is no longer a non-bias estimator when the memory is small. In fact, if the absolute error $|\hat{k}-k|$ (that is not shown in the figures) is compared, the maximum absolute errors of CSE over the measurement bins are smaller than the average absolute errors of OSM in all four experiments. In the experiment with results illustrated in FIGS. 8A-8D, the s value, which minimizes the standard deviation at k=250 as calculated from (26), is 286.

D Plots: For CSE, the numerically-calculated standard deviation, which is the curve titled "CSE_std_cal", matches well with the experimentally-measured value, which is the curve titled "CSE_std_dev". It shows that the approximations made in the analysis do not introduce significant error.

C. Impact of Different s Values on Performance of CSE

The second set of experiments study the impact of different virtual-vector sizes s on the performance of CSE. For these experiments, m=1 MB and the value of s is varied from 200 to 500, while keeping the other parameters the same as in the previous set of experiments. FIGS. 10A and 10B present the bias and the standard deviation, respectively, of CSE. The experimental results show that the performance of CSE is not very sensitive to the choice of s within the range. A wide range of s (here, s=200 to 500) gives comparable results. As shown in FIG. 10B, a larger s value within the range leads to a slightly greater standard deviation for sources whose spreads (k) are small and a slightly smaller standard deviation for sources whose spreads are large (when k is larger).

The second set of experiments was repeated for m=1 MB and the value of s varied from 200 to 1000, while keeping the other parameters the same. FIGS. 11A and 11B present the bias and the standard deviation, respectively, of CSE. The experimental results show that the estimation bias of CSE stays close to zero and the standard deviation changes only slightly for a wide range of s values (from 200 to 500). However, when s becomes too large (such as 1,000), both the estimation bias and the standard deviation jump up.

D. Impact of Different Column Sizes on Performance of OSM

The third set of experiments demonstrate the impact of different column sizes on the performance of OSM by letting m=1 MB and varying the column size r from 64 to 512, while keeping the other parameters the same as in the first set of experiments. FIGS. 12A and 12B present the bias and the standard deviation, respectively, of OSM. None of the r values makes OSM a nonbias estimator. When r is too large (such as 512), both bias and standard deviation are large. When r is too small (such as 64), its estimated spread does not go beyond 267, as shown in FIG. 13A. Comparing r=256 and r=128, the former leads to a much larger standard deviation, as shown in FIG. 12B. The impact of larger deviation can also be seen by comparing FIG. 13B where r=256 and FIG. 7B where r=128.

E. An Example

Detecting Address Scan

The last set of experiments compare CSE and OSM using an application for address scan detection. Suppose the security policy is to report all external sources that contact 250 or more internal destination during a day. If a source with a spread less than 250 is reported, it is called a false positive. If a source with a spread 250 or above is not reported, it is called a false negative. The false positive ratio (FPR) is defined as the number of false positives divided by the total number of sources reported. The false negative ratio (FNR) is defined as the number of false negatives divided by the number of sources whose spreads are 250 or more. The experimental results are shown in Table II.

TABLE II

FALSE POSITIVE RATIO AND FALSE NEGATIVE RATIO WITH RESPECT TO MEMORY SIZE.

| | OSM | | CSE | |
|---|---|---|---|---|
| m (MB) | FPR | FNR | FPR | FNR |
| 0.5 | 0.662 | 0.000 | 0.164 | 0.123 |
| 1 | 0.424 | 0.008 | 0.097 | 0.094 |
| 2 | 0.116 | 0.236 | 0.073 | 0.056 |
| 4 | 0.108 | 0.115 | 0.053 | 0.062 |

Clearly, CSE outperforms OSM by a wide margin when both FPR and FNR are taken into consideration. The FNR is zero for OSM when m=0.5 MB. That is because OSM is a bias estimator in such a small memory. Its FPR is 66.2%.

CSE also has non-negligible FPR and FNR because its estimated spread is not exactly the true spread. To accommodate impreciseness to a certain degree, the security policy may be relaxed to report all sources whose estimated spreads are 250×(1−$\epsilon$) or above, where 0≤$\epsilon$≤1. If a source whose true spread is less than 250×(1−2$\epsilon$) gets reported, it is called an $\epsilon$-false positive. If a source with a true spread 250 or more is not reported, it is called an $\epsilon$-false negative. The FPR and FNR are defined the same as before. The experimental results for $\epsilon$=10% are shown in Table III, and those for $\epsilon$=20% are shown in Table IV, where the FPR and FNR for CSE are merely 0.1% and 0.6% respectively when m=1 MB.

TABLE III $\epsilon$ = 10%, FALSE POSITIVE RATIO AND FALSE NEGATIVE RATIO WITH RESPECT TO MEMORY SIZE.

| | OSM | | CSE | |
|---|---|---|---|---|
| m(MB) | FPR | FNR | FPR | FNR |
| 0.5 | 0.532 | 0.000 | 0.077 | 0.057 |
| 1 | 0.251 | 0.006 | 0.031 | 0.027 |
| 2 | 0.041 | 0.193 | 0.005 | 0.014 |
| 4 | 0.023 | 0.064 | 0.001 | 0.002 |

TABLE IV $\epsilon$ = 20%, FALSE POSITIVE RATIO AND FALSE NEGATIVE RATIO WITH RESPECT TO MEMORY SIZE.

| | OSM | | CSE | |
|---|---|---|---|---|
| m(MB) | FPR | FNR | FPR | FNR |
| 0.5 | 0.401 | 0.000 | 0.023 | 0.022 |
| 1 | 0.135 | 0.002 | 0.001 | 0.006 |
| 2 | 0.013 | 0.146 | 0.000 | 0.002 |
| 4 | 0.006 | 0.030 | 0.000 | 0.000 |

Extension of Estimation Range for CSE

An upper bound exists on the source spread that CSE can estimate. Further embodiments of the invention increase the upper bound of the estimated source spread.

A. Estimation Range

The size s of a virtual vector determines the maximum spread that CSE can estimate. When the spread k of a source is too large such that all s bits in the virtual vector are set to '1', then $V_s=0$ and the item ln(V) in (5) becomes undefined. Hence, for CSE to work, there must be at least one zero in the virtual vector, which sets an upper bound on the maximum spread that CSE can estimate. The maximum value that (5) can produce is s ln($V_m$)+s ln(s). It happens when there is only one zero in the virtual vector of a source (such that $$V_s = \frac{1}{s}\Big).$$

When all bits in the virtual vector are ones (such that $V_s=0$), the source degree is set to the maximum value of the estimation range, s ln($V_m$)+s ln s.

B. An Example

Increasing the Estimation Upper Bound by Increasing Virtual Vector Size

One way to increase the estimation upper bound, s ln($V_m$)+s ln(s), is to enlarge the virtual vector size s. An experiment was again conducted for CSE with m=1 MB and s varied from 200 to 1,000, which extends the estimation upper bound from 200 ln($V_m$)+1,060 to 1,000 ln($V_m$)+6,908. The experimental results are shown in FIGS. 14A-14D. When s=200, FIG. 14A shows that the maximum source degree that CSE can measure is slightly below 1,000. As s increases, CSE can measure increasingly larger source degrees. However, it comes with a penalty. When s becomes too large, the estimation bias and the standard deviation increase significantly for sources with relatively small spreads, as demonstrated in FIGS. 11A and 11B where $k \leq 500$.

C. An Example

Increasing the Estimation Upper Bound by Adopting a Sampling Module

Another approach to increase the estimation range is to adopt a sampling module such as used by Venkatataman et al. and Estan et al. According to an embodiment, CSE incorporates a sampling module to increase estimation range. For this embodiment, let p be the sampling probability. Each contact (src, dst) is hashed into a number H(src|dst) in a range [0,N). Only if the number is smaller than p×N, the contact is recorded by CSE. The estimated spread become $$\frac{\hat{k}}{p},$$

where $\hat{k}$ is computed from (5). The estimation upper bound becomes $$\frac{s \times \ln(V_m) + s\ln(s)}{p},$$

which increases asp decreases.

The experimental results of CSE with sampling are presented in FIGS. 15A-15C. The three plots have sample probabilities, ½, ¼, and ⅟16, respectively. The results demonstrate that when the sampling probability becomes smaller, the estimation range increases and the estimation accuracy is improved for sources with large spreads. However, FIG. 16A shows that when p is too small (such as ⅙), the standard deviation of the estimation worsens for sources with relatively small spreads (e.g., $k \leq 500$). As shown in FIG. 16B, for sources with relatively small spreads, the absolute value of the estimation bias tends to be larger when p is smaller.

D. Maximum Likelihood Estimation

As shown in FIGS. 14-16, increasing the virtual vector size and adopting a sampling module can extend the estimation range. However, once the estimation range is extended too large, the estimation accuracy for small spreads deteriorates. To solve this problem, another embodiment of the invention, called Multiple CSE (MCSE), simultaneously performs multiple independent CSE estimations with different sampling probabilities and selects the best of the estimations based on a maximum likelihood method.

The subject MCSE can use a bit array B (such as array 103) that is divided into a number g of bit segments, denoted as $B_i$, $1 \leq i \leq g$. The jth bit in the array $B_i$ is denoted as $B_i[j]$. Each segment $B_i$ is assigned a sampling probability $p_i$, such that $\Sigma_{i=1}^{g} p_i \leq 1$. The size of $B_i$ is denoted as $m_i$, and is proportional to $p_i$. Namely, $$m_i = \frac{p_i}{\sum_{i=1}^{g} p_i \leq 1} m.$$

Each segment $B_i$ serves as the storage of an independent CSE estimator that has a sampling probability $p_i$. There are, in total, g estimators. An estimator with a larger sampling probability will need to store more contacts, and hence it requires a larger segment size $m_i$.

According to one embodiment, the sampling probabilities are selected by setting $$p_i = \frac{1}{2^i}$$

such that each bit segment provides a different estimation range. The segments with smaller sampling probabilities have larger estimation ranges; they are suitable for sources with larger spreads. The segments with larger sampling probabilities have smaller estimation ranges; they are suitable for sources with smaller spreads due to the relatively small standard deviations in the estimation.

For an arbitrary source address src, a virtual vector of size s is defined for the source address src in each bit segment. The virtual vector for src in $B_i$ can be constructed using (1)-(4) except that B in the formulas is replaced with $B_i$. In particular, according to one embodiment, the virtual vector X(src) can consist of s bits pseudo-randomly selected from $B_i$, and has functions can be used to define the virtual vector as follows:

$$X(\text{src}) = (B_i[H_0(\text{src})], B_i[H_1(\text{src})], \ldots, B_i[H_{s-1}(\text{src})]),$$

where $H_j$, $0 \leq j \leq s-1$, are different hash functions whose range is $[0 \ldots m_i-1]$. According to certain embodiments, all g estimators share the same sampling module, which is implemented as follows:

When a contact (src, dst) is received, it is hashed into a number H(src|dst) in a range [0,N). Let $p_0=0$. If $\Sigma_{j=0}^{i-1} p_j \times N \leq H(\text{src}|\text{dst}) < \Sigma_{j=1}^{i} p_j \times N$ for a certain value of $i \in [1 \ldots g]$, then the contact will be stored in $B_i$, i.e., a bit in $B_i$ will be set to one. If $H(\text{src}|\text{dst}) \geq \Sigma_{j=1}^{i} p_j \times N$, then the contact will not be stored in any bit segment. Clearly, each contact is stored in at most one segment.

After the sampling module determines that a contact (src, dst) should be stored in $B_i$, the bit is set by performing the following assignment:

$$B_i[H_M(\text{src}|R[H_M(\text{dst}) \bmod s])] := 1.$$

Next, at the end of the storage phase, the spread k of a source src at the end of a measurement period can be estimated. Each segment $B_i$ provides an estimation $\hat{k}_i$ as follows:

$$\hat{k}_i = \frac{s \cdot \ln(V_{m,i}) - s \cdot \ln(V_{s,i})}{p_i} \qquad (28)$$

where $V_{m,i}$ is the fraction of bits in $B_i$ whose values are zeros and $V_{s,i}$ is the fraction of bits in the virtual vector of src whose values are zeros. Let $U_{s,i}$ be the number of bits in the virtual vector whose values are zeros. $V_{s,i} = U_{s,i}/s$. In total, there are g estimations: $(\hat{k}_1, \hat{k}_2, \ldots \hat{k}_g)$, which is called the estimation vector.

According to certain embodiments, after performing the multiple independent CSE estimations with different sampling probabilities, the best of the estimations is selected using a maximum likelihood method. For each estimation $\hat{k}_i$, the likelihood value is computed for the probability $P_i$ that the current estimation vector is observed, if k is indeed $\hat{k}_i$. In particular, the likelihood value is computed as the probability $P_i$ for the virtual vectors of the source in the g segments to take their current states, $V_{s,j}$, for $1 \leq j \leq g$.

This can be computed by letting Prob$\{\hat{k}_j | k=\hat{k}_i\}$ be the probability that $\hat{k}_j$ is observed as the spread estimation from $B_j$ under the condition that $k=\hat{k}_i$, and letting Prob$\{V_{s,i}|k=\hat{k}_i\}$ and Prob$\{U_{s,i}|k=\hat{k}_i\}$ be the probabilities that $V_{s,j}$ and $U_{s,i}$ are observed under the condition that $k=\hat{k}_i$ respectively.

$$Prob\{\hat{k}_j | k = \hat{k}_i\} = Prob\{V_{s,i} | k = \hat{k}_i\} \quad (29)$$
$$= Prob\{U_{s,i} | k = \hat{k}_i\}$$
$$= \binom{s}{U_{s,j}} \times \phi(j)^{U_{s,j}} \times (1 - \phi(j))^{s-U_{s,j}},$$

where $\phi(j)$ is the probability for an arbitrary bit in the virtual vector of src (constructed in Bj) remains zero at the end of the measurement period. Each contact made by src and stored in Bj has a probability of $$\frac{1}{s}$$

to set the bit as one. Each contact stored in $B_j$ but not made by src has a probability of $$\frac{1}{m_j}$$

to set the bit as one. Hence, $\phi(j)$ can be approximated as $$\phi(j) = \left(1 - \frac{1}{m_i}\right)^{n_j - \hat{k}_i \times p_j} \left(1 - \frac{1}{s}\right)^{\hat{k}_i \times p_j} \quad (30)$$

where $n_j = -m_j \times \ln(V_{m,j})$ is an estimation for the number of contacts stored in $B_j$, according to (9).

Under the condition that $k=\hat{k}_i$ the probability that the current estimation vector is observed is $$P_i = Prob\{\hat{k}_1, \ldots, \hat{k}_g | k = \hat{k}_i\} \quad (31)$$
$$= \prod_{j=1}^{g} Prob\{\hat{k}_j | k = \hat{k}_i\}$$
$$= \prod_{j=1}^{g} \binom{s}{U_{s,j}} \times \phi(j)^{U_{s,j}} \times (1 - \phi(j))^{s-U_{s,j}}.$$

After $P_i$, $1 \le i \le g$, is computed, the largest one is selected, $P_{i*} \ge P_i$, $\forall 1 \le i \le g$, and $\hat{k}_{i*}$ is used as the final estimation for the spread of the source.

FIGS. 17A-17C present the experimental results of MCSE. In the experiment with results illustrated in FIG. 17A, the bit array B is divided into two segments whose sampling probabilities are ½ and ¼, respectively. In the experiment with results illustrated in FIG. 17B, B is divided into three segments whose sampling probabilities are ½, ¼, and ⅛, respectively. In the experiment with results illustrated in FIG. 17C, B is divided into four segments whose sampling probabilities are ½, ¼, ⅛, and ¹⁄₁₆, respectively. The three plots demonstrate that when the number g of segments increases in MCSE, the estimation range increases and the estimation accuracy is improved for sources with large spreads. However, unlike the embodiment using CSE with sampling, the estimation accuracy for sources with relatively small spreads is not significantly reduced. This can be seen by comparing how closely the points in each plot are located to the line of $\hat{k}=k$. Here, each source is represented by one point whose x coordinate is the source's actual spread and y coordinate is the estimated spread. The shape of the point distribution for $k \le 500$ is similar across the plots, which indicates that the standard deviation and the bias of spread estimation do not differ much when g increases. This observation is confirmed by the quantitative measurement shown in FIGS. 18A and 18B for sources with small spreads. FIG. 18A shows that when g increases from 2 to 4, the standard deviation in spread estimation tends to increase only slightly. FIG. 18B shows that the estimation bias does not noticeably change as g increases.

By comparing FIG. 17C (MCSE whose largest sampling probability is ¹⁄₁₆) with FIG. 15C (CSE whose sampling probability is ¹⁄₁₆), it is evident that MCSE has better estimation accuracy when $k \le 500$. This can also be seen by comparing their standard deviation curves in FIG. 18A (the case of g=4) and FIG. 16A (the case of $$p = \frac{1}{16}$$

).

According to certain embodiments of the invention, a spread estimator module on a router is provided that can inspect the arrival packets and estimate the spread of each source. The subject module can be used, for example, in detecting port scans and DDoS attacks, measuring the infection rate of a worm, assisting resource allocation in a server farm, and determining popular web contents for caching. The subject spread estimator module can deliver good performance in a tight memory space, and achieves space compactness while operating more efficiently than existing spread estimators. Data is stored using virtual vectors, which allow errors in spread estimation to be measured and removed. Further embodiments enhance the range of spread values that the estimator module can measure. Such embodiments, include enlarging the virtual vector size of the CSE, adopting a sampling module for the CSE, and performing MCSE.

All patents, patent applications, and publications referred to or cited herein are incorporated by reference in their entirety, including all figures and tables, to the extent they are not inconsistent with the explicit teachings of this specification.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

It should also be understood that, although the present invention has been described with reference to specific details of certain embodiments thereof, it is not intended that such details should be regarded as limitations upon the scope of the invention except as and to the extent that they are included in the accompanying claims.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto. For example, in any of the above-described embodiments, the roles of the source host and destination host may be reversed.

We claim:

1. One or more non-transitory computer-readable media for storing network contact information, comprising:
   a set of m physical memory locations; and
   one or more virtual vectors each having s virtual memory locations,
   wherein:
      each virtual vector is assigned to a corresponding source host;
      each virtual memory location within each virtual vector is randomly assigned to one or more destination hosts that were contacted by the corresponding source host; and
      each virtual memory location is randomly and uniformly assigned a corresponding physical memory location from the set of m physical memory locations.

2. A method for estimating the spread of a particular source host over a time period, comprising:
   providing an array stored in a high-speed memory with m physical memory locations mapped to one or more virtual vectors each having s virtual memory locations, wherein:
      each virtual vector is assigned to a corresponding source host;
      each virtual memory location within each virtual vector is randomly assigned to one or more destination hosts; and
      each virtual memory location is randomly and uniformly assigned a corresponding physical memory location within the array;
   clearing the array at the beginning of the time period;
   noting in the array a network message received at a network router during the time period by using the one or more virtual vectors and storing a first marker in a selected physical memory location of the array associated with the one or more virtual vectors;
   repeating the noting step for each of a set of additional network messages, wherein the set of additional network messages comprises at least a subset of all network messages received at the network router during the time period;
   determining that the time period has elapsed; and
   using the number of markers stored in the array to estimate the spread of the particular source host.

3. The method for estimating the spread according to claim 2, wherein the network message was sent from a source host to a destination host and the noting step comprises:
   receiving from the network router source host information and destination host information, wherein the source host information is associated with the source host and the destination host information is associated with the destination host;
   performing a first hash function based on the source host information to identify the virtual vector for holding information about the source host;
   performing a second hash function based on the destination host information to identify the virtual memory location within the virtual vector for holding information about the destination host; and
   storing the first marker in the physical memory location assigned to the identified virtual memory location.

4. The method for estimating the spread according to claim 2, wherein using the number of markers stored in the array to estimate the spread of the particular source host comprises:
   counting the number of physical memory locations in the array in which the first marker is not stored and dividing this number by m to obtain $V_m$;
   counting the number of physical memory locations in the virtual vector assigned to the particular source host in which the first marker is not stored and dividing this number by s to obtain $V_s$; and
   computing the estimated spread $\hat{k}$ of the particular source host according to the formula: $\hat{k}=s \cdot \ln(V_m) - s \cdot \ln(V_s)$.

5. The method for estimating the spread according to claim 4, further comprising:
   copying the array to an offline machine,
   wherein the using of the number of markers stored in the array to estimate the spread of the particular source host is performed using the offline machine.

6. The method for estimating the spread according to claim 4, wherein clearing the array at the beginning of the time period comprises initializing each bit of the array to '0';
   wherein storing the first marker in the selected physical memory location comprises setting a bit in the array to a '1';
   wherein counting the number of physical memory locations in the array in which the first marker is not stored comprises counting the number of '0's, and counting the number of physical memory locations in the virtual vector assigned to the particular source host in which the first marker is not stored comprises counting the number of '0's.

7. The method for estimating the spread according to claim 4, wherein the number of virtual memory locations s is in the range of 200 to 500.

8. The method for estimating the spread according to claim 4, wherein the number of virtual memory locations s is less than or equal to 1000.

9. The method for estimating the spread according to claim 2, further comprising:
   performing an initial hash function to source host information and destination host information for the network message and the set of additional network messages received at the network router during the time period, the initial hash function assigning a number to the network message in a range [0,N), where N is equal to $2^n$, where n is a selected number of bits for the source host information and destination host information;
   wherein the network message was sent from a source host to a destination host and has an initial hash number smaller than p×N, where p is a sampling probability, wherein the noting step comprises:
      receiving from the network router source host information and destination host information for the network message having the initial hash number smaller than p×N, wherein the source host information is associated with the source host and the destination host information is associated with the destination host;
performing a first hash function based on the source host information to identify the virtual vector for holding information about the source host;
performing a second hash function based on the destination host information to identify the virtual memory location within the virtual vector for holding information about the destination host; and
storing the first marker in the physical memory location assigned to the identified virtual memory location;
wherein using the number of markers stored in the array to estimate the spread of the particular source host comprises:
counting the number of physical memory locations in the array in which the first marker is not stored and dividing this number by m to obtain $V_m$;
counting the number of physical memory locations in the virtual vector assigned to the particular source host in which the first marker is not stored and dividing this number by s to obtain $V_s$; and
computing the estimated spread $\hat{k}$ of the particular source host according to the formula:

$$\hat{k} = \frac{s \cdot \ln(V_m) - s \cdot \ln(V_s)}{p}.$$

10. The method for estimating the spread according to claim 9, wherein p is in a range of $$\frac{1}{2} \text{ to } \frac{1}{16}.$$

11. The method for estimating the spread according to claim 2, wherein the array stored in the high-speed memory with m physical memory locations mapped to one or more virtual vectors each having s virtual memory locations comprises:
a bit array with a number g of bit segments, where each bit segment $B_i$ has $m_i$ physical memory locations and an assigned sampling probability $p_i$, such that $$\sum_{i=1}^{g} p_i \leq 1, \text{ where } 1 \leq i \leq g \text{ and } m_i = \frac{p_i}{\sum_{i=1}^{g} p_i \leq 1} m,$$

wherein each virtual memory location of the one or more virtual vectors is randomly and uniformly assigned a corresponding physical memory location within each bit segment of the array,
the method further comprising:
performing an initial hash function to source host information and destination host information for the network message and the set of additional network messages received at the network router during the time period, the initial hash function assigning a number to the network message in a range [0,N), where N is equal to $2^n$, where n is a selected number of bits for the source host information and destination host information;
wherein the network message was sent from a source host to a destination host and has an initial hash number greater than or equal to $$\sum_{j=1}^{i-1} p_j \times N$$

and less than $$\sum_{j=1}^{i} p_j \times N,$$

wherein the noting step comprises:
receiving from the network router source host information and destination host information for the network message having the initial hash number greater than or equal to $$\sum_{j=1}^{i-1} p_j \times N$$

and less than $$\sum_{j=1}^{i} p_j \times N,$$

wherein the source host information is associated with the source host and the destination host information is associated with the destination host;
performing a first hash function based on the source host information to identify the virtual vector for holding information about the source host;
performing a second hash function based on the destination host information to identify the virtual memory location within the virtual vector for holding information about the destination host; and
storing the first marker in the physical memory location assigned to the identified virtual memory location,
wherein using the number of markers stored in the array to estimate the spread of the particular source host comprises:
counting, for each bit segment $B_i$, the number of physical memory locations in the bit segment $B_i$ of the array in which the first marker is not stored and dividing this number by $m_i$ to obtain $V_{m,i}$;
counting, for each bit segment $B_i$, the number of physical memory locations in the virtual vector assigned to the particular source host in which the first marker is not stored and dividing this number by s to obtain $V_{s,i}$;
computing, for each bit segment $B_i$, the estimated spread $\hat{k}_i$ of the particular source host according to the formula:

$$\hat{k}_i = \frac{s \cdot \ln(V_{m,i}) - s \cdot \ln(V_{s,i})}{p_i};$$

and
selecting a final estimation from the g number of estimated spreads.

12. The method for estimating the spread according to claim 11, wherein selecting the final estimation comprises:

computing a probability $P_i$ according to the formula:

$$P_i = \prod_{j=1}^{g} \binom{s}{U_{s,j}} \times \phi(j)^{U_{s,j}} \times (1-\phi(j))^{s-U_{s,j}}$$

for each estimated spread of the g number of estimated spreads, where $1 \le j \le g$, where $U_{s,j}$ is the number of physical memory locations in the virtual vector assigned to the particular source host in which the first marker is not stored; and $\phi(j)$ is approximated as $$\phi(j) = \left(1-\frac{1}{m_i}\right)^{n_j - \hat{k}_i \times p_j}\left(1-\frac{1}{s}\right)^{\hat{k}_i \times p_j},$$

where $n_j = -m_j \times \ln(V_{m,j})$; and
selecting the largest $P_i$ as the final estimation.

13. The method for estimating the spread according to claim 11, wherein the sampling probabilities of the bit segments are assigned by setting $$p_i = \frac{1}{2^i}.$$

14. A spread estimator module on a router, the spread estimator module comprising:
a memory having m physical memory locations;
a contact storage module using one or more virtual vectors each having s virtual memory locations, wherein:
  each virtual vector is assigned to a corresponding source host;
  each virtual memory location within each virtual vector is randomly assigned to one or more destination hosts that were contacted by the corresponding source host; and
  each virtual memory location is randomly and uniformly assigned a corresponding physical memory location from the set of m physical memory locations; and
an offline computing module, wherein the offline computing module receives a copy of an array stored in the memory and computes an estimated spread using the copy of the array.

15. The spread estimator module according to claim 14, wherein the contact storage module:
receives from the router source host information and destination host information of a network message received at the router, wherein the source host information is associated with the source host and the destination host information is associated with the destination host;
performs a first hash function based on the source host information to identify the virtual vector for holding information about the source host;
performs a second hash function based on the destination host information to identify the virtual memory location within the virtual vector for holding information about the destination host; and
stores a marker in the physical memory location assigned to the identified virtual memory location.

16. The spread estimator module according to claim 14, wherein the offline computational module:

counts the number of physical memory locations in the copy of the array in which the marker is not stored and divides this number by m to obtain to obtain $V_m$;
counts the number of physical memory locations in the virtual vector assigned to a particular source host in which the marker is not stored and dividing this number by s to obtain $V_s$; and
computes the estimated spread $\hat{k}$ of the particular source host according to the formula: $\hat{k} = s \cdot \ln(V_m) - s \cdot \ln(V_s)$.

17. The spread estimator module according to claim 14, wherein the number of virtual memory locations s is in the range of 200 to 500.

18. The spread estimator module according to claim 14, wherein the number of virtual memory locations s is less than or equal to 1000.

19. The spread estimator module according to claim 14, further comprising:
a sampling module, wherein the sampling module:
  performs an initial hash function to source host information and destination host information for a contact, the initial hash function assigning a number to the network message in a range [0,N), where N is equal to $2^n$, where n is a selected number of bits for the source host information and destination host information; and
  filters information sent to the contact storage module by only allowing source host information and destination host information for contacts having an initial hash number smaller than p×N, where p is a sampling probability, to be sent to the storage module;
wherein the offline computational module:
  counts the number of physical memory locations in the copy of the array in which the marker is not stored and divides this number by m to obtain to obtain $V_m$;
  counts the number of physical memory locations in the virtual vector assigned to a particular source host in which the marker is not stored and dividing this number by s to obtain $V_s$; and
  computes the estimated spread k of the particular source host according to the formula:

$$\hat{k} = \frac{s \cdot \ln(V_m) - s \cdot \ln(V_s)}{p}.$$

20. The spread estimator module according to claim 19, wherein p is in a range of $$\frac{1}{2} \text{ to } \frac{1}{16}.$$

21. The spread estimator module according to claim 14, further comprising:
a sampling module, wherein the sampling module:
  performs an initial hash function to source host information and destination host information for a contact, the initial hash function assigning a number to the network message in a range [0,N), where N is equal to $2^n$, where n is a selected number of bits for the source host information and destination host information; and
  filters information sent to the contact storage module by only allowing source host information and destination host information for contacts having an initial hash number greater than or equal to $$\sum_{j=1}^{i-1} p_j \times N$$

and less than $$\sum_{j=1}^{i} p_j \times N,$$

to be sent to the storage module, where $p_i$ is a sampling probability assigned to each bit segment $B_i$ of a number g of bit segments in the memory, where $1 \leq i \leq g$, where each bit segment has $m_i$ physical memory locations;

wherein the offline computational module:

counts, for each bit segment $B_i$, the number of physical memory locations in the bit segment $B_i$ of the array in which the first marker is not stored and dividing this number by $m_i$ to obtain $V_{m,i}$;

counts, for each bit segment $B_i$, the number of physical memory locations in the virtual vector assigned to a particular source host in which the first marker is not stored and dividing this number by s to obtain $V_{s,i}$;

computes, for each bit segment $B_i$, the estimated spread $\hat{k}_i$ of the particular source host according to the formula:

$$\hat{k}_i = \frac{s \cdot \ln(V_{m,i}) - s \cdot \ln(V_{s,i})}{p_i};$$

and selects a final estimation from the g number of estimated spreads.

22. The spread estimator module according to claim 21, wherein the offline computational module selects the final estimation from the g number of estimated spreads by:

computing a probability $P_i$ according to the formula:

$$P_i = \prod_{j=1}^{g} \binom{s}{U_{s,j}} \times \phi(j)^{U_{s,j}} \times (1 - \phi(j))^{s - U_{s,j}}$$

for each estimated spread of the g number of estimated spreads, where $1 \leq j \leq g$, where $U_{s,j}$ is the number of physical memory locations in the virtual vector assigned to the particular source host in which the first marker is not stored; and $\phi(j)$ is approximated as $$\phi(j) = \left(1 - \frac{1}{m_i}\right)^{n_j - \hat{k}_i \times p_j} \left(1 - \frac{1}{s}\right)^{\hat{k}_i \times p_j},$$

where $n_j = -m_j \times \ln(V_{m,j})$; and selecting the largest $P_i$ as the final estimation.

* * * * *

UNITED STATES PATENT AND TRADEMARK OFFICE
CERTIFICATE OF CORRECTION

PATENT NO. : 8,842,690 B2
APPLICATION NO. : 13/147534
DATED : September 23, 2014
INVENTOR(S) : Shigang Chen et al.

It is certified that error appears in the above-identified patent and that said Letters Patent is hereby corrected as shown below:

In The Specification

Column 1,
Line 12, "in its-their" should read --in their--.

Column 3,
Line 48, "to/dense" should read --to $l$ dense--.

Column 7,

Lines 3-8, "value of measured $\frac{\sqrt{Var(k)}}{k}$" should read --value of $\frac{\sqrt{Var(k)}}{k}$ measured--.

Column 13,
Lines 32-33, "is logically" should read --in $B$, is logically--.

Column 14,
Lines 32-33, "$\Lambda j \in [0..s - 1]$" should read --$\forall j \in [0..s - 1]$--.

Column 20,
Line 65, "and/ memory" should read --and $l$ memory--.

Column 24,
Line 36, "item ln (V)" should read --item ln (Vs)--.

Column 25,
Line 31, "asp decreases." should read --as p decreases.--.

Signed and Sealed this
Eighth Day of September, 2015

Michelle K. Lee
*Director of the United States Patent and Trademark Office*

CERTIFICATE OF CORRECTION (continued)
U.S. Pat. No. 8,842,690 B2

Column 25,

Line 38, "(such as $\frac{1}{6}$)" should read --(such as $\frac{1}{16}$)--.

Column 26,

Line 43, "(src|R" should read --($src \oplus R$--.

In The Claims

Column 34,

Line 40, "spread k" should read --spread $\tilde{k}$ --.

Column 35,

Line 18, "has m," should read --has $m_i$--.